US008824527B2

(12) United States Patent (10) Patent No.: US 8,824,527 B2
Thompson et al. (45) Date of Patent: Sep. 2, 2014

(54) OFDM RECEIVER WITH TIME DOMAIN CHANNEL ESTIMATION

(75) Inventors: Steven C Thompson, San Diego, CA (US); Fernando Lopez de Victoria, San Francisco, CA (US)

(73) Assignee: Acorn Technologies, Inc., Santa Monica, CA (US)

(*) Notice: Subject to any disclaimer, the term of this patent is extended or adjusted under 35 U.S.C. 154(b) by 249 days.

(21) Appl. No.: 13/416,990

(22) Filed: Mar. 9, 2012

(65) Prior Publication Data

US 2013/0121392 A1 May 16, 2013

Related U.S. Application Data

(60) Provisional application No. 61/559,793, filed on Nov. 15, 2011.

(51) Int. Cl.
 *H04B 1/00* (2006.01)
(52) U.S. Cl.
 USPC ........... 375/148; 375/230; 375/340; 370/252; 455/67.11
(58) Field of Classification Search
 CPC .............. H04L 27/2675; H04L 27/261; H04L 27/2611; H04L 1/0045; H04L 5/0048; H04L 5/0051; H04L 27/2655; H04B 17/0042; H04B 17/0057; H04B 17/006; H04B 17/0075
 USPC ......... 375/148, 149, 229–232, 340, 342, 354, 375/368; 370/252, 321, 442, 465, 478, 492, 370/500, 503; 455/67.11, 226.1–226.4
 See application file for complete search history.

(56) References Cited

U.S. PATENT DOCUMENTS

| 6,219,334 B1 | 4/2001 | Sato et al. |
| 7,099,270 B2 | 8/2006 | Yamaguchi |

(Continued)

FOREIGN PATENT DOCUMENTS

| CN | 101127753 A | 2/2008 |
| WO | WO 2007/149297 A1 | 12/2007 |

(Continued)

OTHER PUBLICATIONS

Zhao, et al., "A Novel Channel Estimation Method for OFDM Mobile Communication Systems Based on Pilot Signals and Transform-Domain Processing," IEEE 47th Vehicular Technology Conference, May 4-7, 1997, pp. 2089-2093, vol. 3.

(Continued)

*Primary Examiner* — Dac Ha
(74) *Attorney, Agent, or Firm* — Orrick, Herrington & Sutcliffe LLP

(57) ABSTRACT

An OFDM communication system performs time domain channel estimation responsive to received symbols before the symbols are processed by a fast Fourier transform. The communication system generates virtual pilots from actual pilots to improve the stability and quality of channel estimation. The system generates a reference signal from the actual and virtual pilots and correlates the resulting reference signal with a signal responsive to the received symbol to generate an initial channel impulse response (CIR) and to determine statistics about the channel. In some circumstances, the resulting reference signal is correlated with a modified symbol in which the actual and virtual pilot locations are emphasized and the data locations are deemphasized. Time domain channel estimation iteratively improves on the initial CIR. The system determines channel estimates for data only symbols through averaging such as interpolation.

47 Claims, 4 Drawing Sheets

(56) References Cited

U.S. PATENT DOCUMENTS

| | | | |
|---|---|---|---|
| 7,289,049 B1 | 10/2007 | Fudge et al. | |
| 7,394,876 B2 | 7/2008 | Sestok, IV et al. | |
| 7,609,616 B2 | 10/2009 | Jacobsen | |
| 7,639,738 B2 | 12/2009 | Lopez de Victoria | |
| 7,697,412 B2 | 4/2010 | Anderson et al. | |
| 7,697,449 B1 | 4/2010 | Shirali et al. | |
| 7,848,463 B2 | 12/2010 | Li et al. | |
| 7,995,688 B2 | 8/2011 | Hong et al. | |
| 8,229,045 B2 * | 7/2012 | Kwak et al. | 375/346 |
| 2004/0219883 A1 | 11/2004 | Pauli et al. | |
| 2005/0147026 A1 | 7/2005 | Jones, IV et al. | |
| 2006/0029279 A1 | 2/2006 | Donoho | |
| 2006/0291578 A1 | 12/2006 | Singh et al. | |
| 2008/0117995 A1 | 5/2008 | Anderson et al. | |
| 2008/0130771 A1 | 6/2008 | Fechtel et al. | |
| 2008/0151989 A1 | 6/2008 | Von Elbwart et al. | |
| 2008/0228446 A1 | 9/2008 | Baraniuk et al. | |
| 2009/0103666 A1 * | 4/2009 | Zhao et al. | 375/341 |
| 2010/0002788 A1 | 1/2010 | Wu et al. | |
| 2010/0272194 A1 | 10/2010 | Zhengang et al. | |
| 2010/0284478 A1 | 11/2010 | Liao et al. | |
| 2011/0122789 A1 * | 5/2011 | Haustein et al. | 370/252 |
| 2011/0142118 A1 | 6/2011 | Seo et al. | |
| 2012/0082269 A1 * | 4/2012 | Chiang et al. | 375/340 |
| 2013/0058443 A1 * | 3/2013 | Carbonnelli et al. | 375/350 |

FOREIGN PATENT DOCUMENTS

| | | |
|---|---|---|
| WO | WO 2010/090787 A1 | 8/2010 |
| WO | WO 2011/066271 | 6/2011 |

OTHER PUBLICATIONS

Saeed, et al., "MIMO OFDM Channel Estimation Based on RLS Algorithm: the Time-versus Frequency-domain Implementations," Communications, 2007. Asia-Pacific Conference on Communications, Oct. 18-20, 2007, pp. 547-550.

Blumensath, et al. "Gradient Pursuits," IEEE, Signal Processing, Jun. 2008, pp. 2370-2382, vol. 56, Issue 6.

Berger, et al., "Sparse Channel Estimation for OFDM: Over-Complete Dictionaries and Super-Resolution," IEEE Signal Processing Advances in Wireless Communications, 2009, Jun. 21-24, 2009, pp. 196-200.

Berger, et al., "Sparse Channel Estimation for Multicarrier Underwater Acoustic Communication: From Subspace Methods to Compressed Sensing," IEEE, Signal Processing, Mar. 2010, pp. 1708-1721, vol. 58, Issue 3.

Budiarjo, et al., "On the Use of Virtual Pilots with Decision Directed Method in OFDM Based Cognitive Radio Channel Estimation Using 2x1-D Wiener Filter," IEEE, Communications, May 19-23, 2008, pp. 703-707.

Yücek, et al., "A Comparative Study of Initial Downlink Channel Estimation Algorithms for Mobile WiMAX," IEEE, Xplore Digital Library, Mar. 25-29, 2007, pp. 32-37.

De Baynast, et al., "Chip-level LMMSE Equalization for Downlink MIMO CDMA in Fast Fading Environments," IEEE Global Telecommunications Conference, Nov. 29-Dec. 3, 2004, pp. 2552-2556, vol. 4.

Abari, et al., "Low complexity channel estimation for LTE in fast fading environments for implementation on multi-standard platforms," IEEE, Vehicular Technology Conference, Sep. 6-9, 2010, pp. 1-5.

Candes, "Compressive sampling," Proceedings of the International Congress of Mathematicians, 2006, pp. 1-20, Madrid, Spain.

Hoeher, et al., "Two-Dimensional Pilot-Symbol-Aided Channel Estimation by Wiener Filtering," IEEE, Acoustics, Speech, and Signal Processing, Apr. 21-24, 1997, pp. 1845-1848, vol. 3.

Fornasier, et al., "Compressive Sensing," Apr. 18, 2010, pp. 1-49.

Huang, et al., "Kalman-filter-based channel estimation for orthogonal frequency-division multiplexing systems in time-varying channels," IET, Communications, Aug. 2007, pp. 795-801, vol. 1, Issue 4.

Edfors, et al., "OFDM Channel Estimation by Singular Value Decomposition," IEEE Communications, Jul. 1998, pp. 931-939, vol. 46, Issue 7.

Maechler, et al., "Implementation of Greedy Algorithms for LTE Sparse Channel Estimation" Signals, Systems and Computers (ASILOMAR), Nov. 7-10, 2010, pp. 400-405.

Mallat, et al., "Matching Pursuits With Time-Frequency Dictionaries," IEEE, Signal Processing, Dec. 1993, pp. 3397-3415, vol. 41, Issue 12.

Maechler, et al., "Matching Pursuit: Evaluation and Implementation for LTE Channel Estimation," IEEE, Circuits and Systems (ISCAS), May 30-Jun. 2, 2010, pp. 589-592.

Özbek, et al., "Pilot-Symbol-Aided Iterative Channel Estimation for OFDM-based Systems".

Kinjo, "Time domain channel estimation schemes for OFDM systems with multiple antenna transmissions," IEEE, Intelligent Signal Processing and Communication Systems, Jan. 7-9, 2009, pp. 232-235.

Rinne, et al., "Pilot Spacing in Orthogonal Frequency Division Multiplexing Systems on Practical Channels," IEEE, Consumer Electronics, Nov. 1996, pp. 959-962, vol. 42, Issue 4.

Doukopoulos, et al., "Robust Channel Estimation via FFT Interpolation for Multicarrier Systems," IEEE, Vehicular Technology Conference, Apr. 22-25, 2007, pp. 1861-1865.

Pati, et al., "Orthogonal Matching Pursuit: Recursive Function Approximation with Applications to Wavelet Decomposition," Signals, Systems and Computers, Nov. 1-3, 1993, pp. 40-44, vol. 1.

Le Saux, et al., "Robust Time Domain Channel Estimation for MIMO-OFDMA Downlink System," Electrical Engineering, 2007, pp. 357-366, vol. 1.

Tauböck, et al., "A Compressed Sensing Technique for OFDM Channel Estimation in Mobile Environments: Exploiting Channel Sparsity for Reducing Pilots," IEEE, Acoustics, Speech and Signal Processing, Mar. 31-Apr. 4, 2008, pp. 2885-2888.

Schafhuber, et al., "Adaptive Wiener Filters for Time-Varying Channel Estimation in Wireless OFDM Systems," IEEE, Acoustics, Speech and Signal Processing, Apr. 6-10, 2003, pp. 688-691, vol. 4.

Wang, et al., "A New Channel Estimation Method Based on Distributed Compressed Sensing," IEEE, Wireless Communications and Networking Conference, Apr. 18-21, 2010, pp. 1-4.

Wu, et al., "Channel Estimation for OFDM Systems with Subspace Pursuit Algorithm," ICGCS, Green Circuits and Systems, Jun 21-23, 2010, pp. 269-272.

Wan, et al., "The Modified Iterative Detector/Estimator Algorithm for Sparse Channel Estimation," Oceans 2010, Sep. 20-23, 2010, pp. 1-6.

Edfors, et al. "Analysis of DFT-Based Channel Estimators for OFDM," Wireless Personal Communications, 2000, pp. 55-70, vol. 12.

Ozdemir, et al. "Channel Estimation for Wireless OFDM Systems," IEEE Communications, 2007, pp. 18-48, vol. 9, No. 2.

Van De Beek, et al. "On Channel Estimation in OFDM Systems," Vehicular Technology Conference, Jul. 25-27, 1995, pp. 815-819, vol. 2.

Jia, et al., "Improved Channel Estimation Method Based on Time-Domain Processing for OFDM Systems", *Wireless Communications, Networking and Mobile Computing, IEEE International Conference*, pp. 13-16 (Sep. 21, 2007).

Lin, et al., "A Novel Channel Estimation Method Using Virtual Pilots in MIMO OFDM Systems", *IEICE Transactions on Communications*, E91-B(11):3764-3767 (Nov. 2008).

Sun, et al., "A Time Domain Iteration-based Channel Estimation Method in OFDM System with Null Subcarriers" *2010 IEEE Vehicular Technology Conference*, pp. 1-5 (May 16-19, 2010).

Werner, et al., "Low-Complexity Time-Domain Channel Estimators for Mobile Wireless OFSM Systems", *Proc. IEEE Workshop on Signal Processing System Design and Implementation, IEEE*, pp. 245-250 (Nov. 2, 2005).

Werner, et al., "Combined Frequency and Time Domain Channel Estimation in Mobile MIMO-OFDM Systems", *2006 IEEE International Conference on Toulouse*, France, p. IV373-IV376 (May 14-19, 2006).

International Search Report, International Appln. No. PCT/US2012/062094, Mar. 25, 2013.

\* cited by examiner

OFDM RECEIVER WITH TIME DOMAIN CHANNEL ESTIMATION

RELATED APPLICATION

This application claims priority from U.S. provisional patent application Ser. No. 61/559,793, entitled "OFDM Receiver with Time Domain Channel Estimation," filed on Nov. 15, 2011 and incorporated by reference in its entirety.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. This notice applies to the software and data as described below and in the drawings.

BACKGROUND

1. Field of the Invention

The present invention relates to a system and a method for processing communication signals to more efficiently achieve channel estimation, particularly in providing channel estimation in an orthogonal frequency division multiplexing (OFDM) receiver that performs frequency domain processing.

2. Description of the Related Art

To increase data rates and mitigate multipath, advanced networks including so-called 4G wireless networks such as WiMAX and LTE have adopted variations of the orthogonal frequency division multiplexing (OFDM) waveform for their PHY layer. The PHY layer is the physical, electromagnetic means by which bits of information are transmitted and received over the air or wire. OFDM offers much sought-after bandwidth efficiency, with a built-in mitigation for the multipath of the wireless channels in urban environments. The sensitivities of OFDM transmission are well-understood. The "bit-pump" scheme for the PHY layer has proven successful in digital subscriber line (DSL, wired) OFDM applications. On the other hand, mobile wireless OFDM applications still face challenges to achieve OFDM's designed capacity.

At the core of the practical and theoretical advantages of OFDM is the use of a fast Fourier transform (FFT). The FFT implemented in OFDM can be viewed as analogous to a bank of tuners for $N_c$-simultaneous radio stations because each of the tones generated by the FFT can be independently assigned to users. The OFDM PHY provides or receives a simultaneous blast, over a short period of time, of bits on each subcarrier frequency (tone) with a complete, or partial, allocation of subcarriers to a given user. Making a partial allocation of subcarriers among different users and aggregating many users within one period is one multiple-access scheme for OFDM. In the case of 10 MHz bandwidth channels, a user can be receiving up to $N_c$=840 (WiMAX) or 600 (LTE) simultaneous tones, over a very short duration, such as 0.1 milliseconds. These $N_c$-tones per period of time make up an OFDM symbol. The allocation of many users in one symbol is called OFDMA.

Wireless standards usually consist of three important time segments, defined by the bandwidth available and the information's time sensitivity. A number of symbols are concatenated to define a frame, which is the longest relevant unit of time and for example might be ten milliseconds. If the standards assign twenty symbols to a frame, then the symbol duration is 0.5 milliseconds. Finally, the FFT size and cycle prefix duration define the time spacing between samples, so a 1024 point FFT and 128 point CP define a sampling time of 43 nanoseconds. Although FFT computations can be comparatively efficient, the FFT size for an exemplary OFDM system is sufficiently large (e.g., 1024 samples in the 10 MHz bandwidth case) that computational demands remain rather high and power consumption remains an important constraint in designing receivers for user handsets.

OFDM systems are more sensitive and have less robust signal acquisition than 3G systems based on code division multiple access (CDMA). The sensitivity of OFDM systems comes from their use of the fast Fourier transform (FFT) to transform incoming signals from the time to frequency domain. The FFT in OFDM systems can deviate from ideal assumptions under very common real-world conditions and receiver implementations. If the assumptions underlying the FFT algorithm fail, cross talk develops between all of the $N_c$-channels (on $N_c$ subcarriers) being transmitted. Crosstalk between subcarriers degrades performance, which in turn causes bit error rates (BER) to increase.

A wireless OFDM handset may receive multiple paths (copies with different delays) of the same signal from a transmission tower ("base station") due to reflections from structures or large water surfaces. This non-line-of-sight reception or multipath causes the signal to be distorted from the flat frequency domain "shape" output by the transmitter. A receiver must compute a filter to restore the signal to its original flat spectral shape; that filter is said to equalize the signal. OFDM receivers perform a critical equalization computation for each OFDM symbol transmitted.

OFDM, unlike most other modulation strategies commonly used in communication systems, can include two equalizers to improve signal quality: a time equalizer (TEQ) and a frequency equalizer (FEQ). Some OFDM applications such as DSL include a time equalizer while others, such as systems that implement current wireless standards, do not demand a time equalizer. All practical OFDM receivers have a frequency equalizer. Whether a receiver includes a time equalizer or only a frequency equalizer, the receiver needs to perform channel estimation to at least initially determine values of the equalizer coefficients before the equalizer can be used to improve the signal quality. Determining the coefficients for frequency equalizers typically is performed in the frequency domain.

FIG. 1 schematically illustrates an OFDM communication system, including an OFDM transmitter 10 that generates a radio signal modulated with information such as data generated by a computer network or voice data. The radio signal travels over the channel 12 to a receiver 14. Channel 12 distorts the radio signal in various ways, including by transmission over multiple paths of different lengths, introducing multiple copies of the radio signal with different offsets and amplitudes in the mechanism known as multipath. Conventional OFDM receiver circuitry 14 down converts the received signal to baseband and then analog-to-digital converts that signal to produce the information signal that is input into the OFDM processing circuitry shown in FIG. 1. The radio signal is input to an alignment element 16 that aligns the signal temporally so that it can be processed according to transmission standards. Following the alignment element 16, the signal is passed to a processing element 18 that removes the cycle prefix (CP) from the signal. A conventional OFDM transmitter 10 adds a CP of length $N_{CP}$, which consists of the last $N_{CP}$ samples, to a unique signal waveform of length N so that the digital signal that the transmitter converts to analog and transmits is of length $N+N_{CP}$. An initial step of the receiver's reverse conversion process then is to remove and discard the added $N_{CP}$ cycle prefix samples. Following that step, a serial to parallel conversion element organizes and converts the serial signal into a parallel signal for further processing. The cycle prefix can be removed either before or after the serial to parallel conversion.

After CP removal 18 the parallel data is provided to a fast Fourier transform (FFT) processor 20 that converts the time domain samples s(n) to a set of frequency domain samples $R_j(k)$ for processing. The received OFDM symbol is assumed to be corrupted by the channel, which is assumed for OFDM to introduce amplitude and phase distortion to the samples from each of the subcarrier frequencies used in the OFDM system. The FEQ 22 applies an amplitude and phase correction specific to each of the frequencies used in the OFDM system to the various samples transmitted on the different frequencies. To determine the correction to be applied by the FEQ 22, the FEQ 22 needs an estimate of the channel's amplitude and phase variations from ideal at each frequency.

A conventional OFDM channel estimator 24 used in FIG. 1 typically receives and estimates a channel based on a set of pilot tone locations 26 or another signal that has predictable characteristics such as known bits and subcarrier locations. This is termed frequency domain channel estimation or FDCE. The pilot tones are generally dictated by the relevant standards. It may be necessary to interpolate from the received information to provide channel estimate information for each subcarrier or tone. All FDCE implementations react to the FFT output OFDM symbol to extract the pilots. The channel estimate at each pilot may be determined as the amplitude and phase rotation from the ideally expected post-demodulation value of "+1" for each pilot. That is, any deviation from this "+1" value constitutes the distortion from the channel at that frequency's bandwidth. The value of the channel at the data subcarrier frequencies can be estimated by interpolating the values obtained at the pilot subcarrier frequencies. Various improvements on simple channel estimation schemes are known and are conventionally implemented in the frequency domain. The frequency equalizer 22 receives the signals from the fast Fourier transform processor 20 and the channel estimates from the estimator 24 and equalizes the signal. The output of the equalizer 22 typically is provided to a parallel to serial element that converts the parallel outputs of the equalizer to a serial output user signal.

An OFDM symbol is constructed by setting active data subcarrier values to non-zero values from a prescribed set of values according to the number of bits to be "loaded" into that OFDM symbol. These values are then subjected to an inverse fast Fourier transform (IFFT) to obtain the time-domain samples. Then, a cycle prefix is appended to the beginning of the symbol by taking a defined number of samples from the end of the symbol's time-domain samples. If the IFFT produces 1024 samples, then the number of time-samples is 1024. Certain standards select the CP to have length 128. That means the transmitter selects the last 128 samples from the sequence of 1024 samples and pre-pends those samples so that they become the first 128 samples in the transmitted OFDM symbol, which has a total of 1152 samples. Because of this construction, selecting any 1024 samples out of the 1152 samples of the OFDM symbol produces a circular shift on the original 1024 OFDM time samples.

In the case of the WiMAX standard, the OFDM symbol can be transmitted on 60 subchannels with 14 active subcarriers per subchannel, for a total of 840 active subcarriers, with 4 pilots per subchannel. The location of the pilots in any given symbol, and therefore subchannel, is prescribed by the standard.

One theoretical advantage of OFDM is that equalization can be performed after the FFT for each received tone individually and through a rather simple algorithm. Another advantage that enables OFDM receivers is that equalizer coefficients need only be estimated for each subcarrier that is relevant to the user, a quantity smaller than the FFT size. The values for each equalizer coefficient corresponding to each tone will depend on the estimation of the channel coefficient—termed channel estimation. Like many operations in OFDM receivers, typical OFDM receivers perform channel estimation after the FFT because the channel estimation at that point is performed simply and efficiently based on a user's tone allocation. Because channel estimation is performed after the FFT, the tones will be impacted by FFT and post-FFT distortions, known as inter-carrier interference (ICI). ICI generally manifest through three conditions: 1) errors in frequency tuning; 2) doppler from mobility; and 3) interference from other cell-sites. OFDM systems accommodate inter-symbol interference by providing a time gap between symbols, so that inter-symbol interference generally is of less concern for OFDM as compared to other wireless schemes.

Any given channel has a well-known limit to its capacity. In current OFDM implementations, there are additional losses in capacity below the expected rates. Channel estimation errors are a principal culprit. Since ICI affects the channel estimation algorithms post-FFT in typical implementations, poor channel estimation leads to inaccurate equalizer coefficients. Increased bit error rate (BER), due to myriad conditions such as demanding channels and poor channel estimation, can be accommodated by reducing the transmitted bit rate offered to a user. In effect, reducing the transmitted bit rate allows for robustness against interference. However, this is a non-linear correction, since the OFDM scheme allows for transmission of two, four or six bits per tone and consequently, under some circumstances, mitigating distortion requires fewer than 2 bits/tone be transmitted, which means the system makes no data available to the user at all.

SUMMARY OF THE PREFERRED EMBODIMENTS

One aspect of the present invention provides a method for processing OFDM signals, comprising determining a reference signal based on standard-dictated pilot locations and virtual pilot locations. The virtual pilot locations are in addition to and responsive to the standard-dictated pilot locations. The method performs time domain channel estimation responsive to the reference signal and equalizes a received symbol responsive to the time domain channel estimation.

Another aspect of the present invention provides a method for processing OFDM signals comprising receiving a mixed symbol of pilot and data information. A set of virtual pilot information is provided responsive to actual pilot information. A reference signal is determined based on at least virtual pilot locations. The virtual pilot locations are in addition to and responsive to actual pilot locations. Time domain channel estimation is performed responsive to the reference signal and a received symbol is equalized responsive to the time domain channel estimation.

Another aspect of the present invention provides a method for processing OFDM signals comprising generating a time domain channel impulse response responsive to one or more received OFDM symbols. This time domain channel impulse response has a first set of samples. The first set of samples is evaluated to identify a second set of samples comprising an estimated time domain channel impulse response. The estimated time domain channel impulse response is improved on to generate an improved time domain channel estimate. A received symbol is equalized in a manner responsive to the improved time domain channel estimate.

Still another aspect of the present invention provides a method for processing OFDM signals comprising generating a time domain channel impulse response responsive to one or more received OFDM symbols. This time domain channel impulse response has a first set of samples. The first set of samples is evaluated to identify a first sample position based on amplitudes of the first set of samples and, responsive to the first sample position, a second set of samples is selected to be a truncated time domain channel impulse response. The method improves on the truncated time domain channel impulse response to generate an improved time domain channel estimate and equalizes a received symbol responsive to the improved time domain channel estimate.

DETAILED DESCRIPTION OF THE PREFERRED EMBODIMENT

Figure 1:
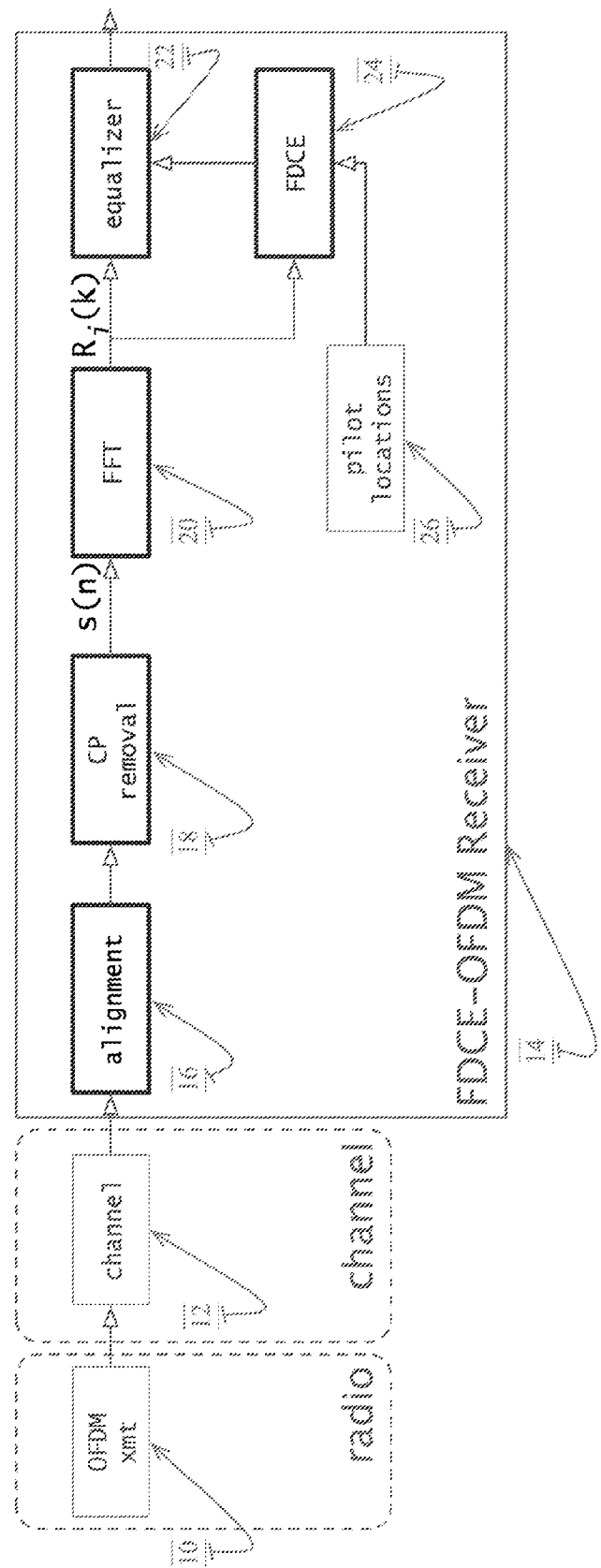
FIG. 1 schematically illustrates an OFDM communication system including an OFDM transmitter and a frequency domain channel estimation OFDM receiver.

Orthogonal frequency division multiplexing (OFDM) systems implementing time-domain channel estimation (TDCE) can offer superior performance, e.g., more robust performance, as compared to OFDM systems implementing frequency-domain channel estimation (FDCE) approaches. In this context, robustness is viewed as the ability of the communication system to work in the presence of Doppler, interference or carrier offset conditions or combinations of these conditions. OFDM systems implementing TDCE can be more robust because they may, in preferred implementations, measure the channel using statistical methods or other strategies that minimize the corruption from interference. In contrast, OFDM systems that use frequency-domain channel estimation typically measure the channel through analysis of the received signal after performing a fast Fourier transform (FFT) on the received signal. The fast Fourier transform is central to OFDM systems but the FFT also "cements" interference into the signal in a way that may degrade frequency domain channel estimation.

Preferred implementations of a TDCE OFDM receiver can provide lower power consumption for a given level of functionality. Preferably a lower power consumption system is provided by one or more of using a comparatively less complex system, performing channel estimation once per OFDM symbol, or achieving higher accuracy to facilitate implementation-related capacity-gap reduction. TDCE OFDM receivers as described here can address each of these strategies for providing lower power consumption.

One variation of a preferred OFDM communication system performs time domain channel estimation responsive to received symbols before the symbols are processed through a fast Fourier transform. The communication system preferably generates virtual pilots from actual pilots to improve the stability and quality of channel estimation. These variations of preferred systems generate a reference signal from the actual and virtual pilots and correlate the resulting reference signal with a signal responsive to the received symbol to generate an initial channel impulse response (CIR) and to determine statistics about the channel. In some circumstances, the resulting reference signal is correlated with a modified symbol in which the actual and virtual pilot locations are emphasized and the data locations are deemphasized. In some implementations, time domain channel estimation preferably is responsive to the CIR and metrics characterizing the channel, such as channel statistics, to iteratively improve on the initial CIR. Preferred aspects of the system determine channel estimates for data only symbols through averaging, with the averaging preferably performed through interpolation or interpolation and extrapolation and preferably performed in the frequency domain.

Another variation of a preferred OFDM communication system performs time domain channel estimation starting from a frequency domain correlation of a data set including pilot tones and a fast Fourier transform processed symbol. The resulting correlation is transformed to the time domain, for example through an IFFT, to provide an initial channel impulse response (CIR) and, as before, to determine statistics about the channel. The set of pilot tones used for the correlation may, for example, be the set of actual pilots dictated by the appropriate standard. When greater robustness or stability is desired, it is preferable that the set of pilot tones used for the correlation include both actual pilots dictated by standard and virtual pilots determined as discussed below. Further processing of the time domain CIR to generate an improved time domain channel estimate and to, among other processes, synchronize the time domain channel estimate proceed as discussed above and below.

Figure 2:
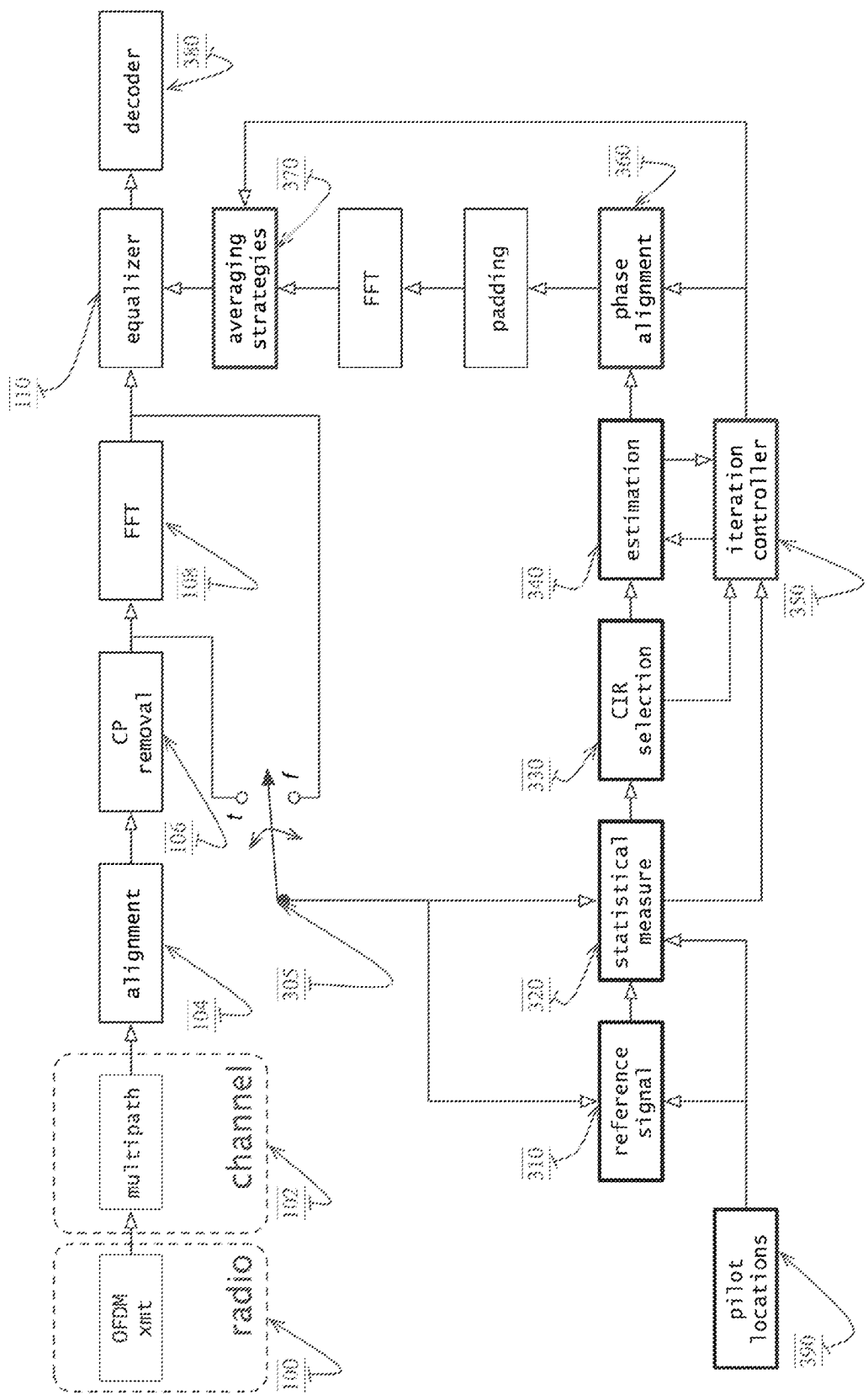
FIG. 2 schematically illustrates an OFDM communication system including a time domain channel estimation OFDM receiver.

FIG. 2 is a basic schematic diagram of a time domain channel estimation (TDCE) orthogonal frequency domain multiplexing (OFDM) receiver within an overall OFDM system. The OFDM communication system includes an OFDM transmitter 100 that generates radio signals modulated with information such as data generated by a computer network or voice data. The radio signal travels over the channel 102 to a preferred implementation of a TDCE OFDM receiver. Channel 102 distorts the radio signal in various ways, including by transmission over multiple paths of different lengths, which introduces multiple copies of the radio signal with different offsets and amplitudes in the mechanism known as multipath. The radio signal is down converted and input to an alignment element 104 that aligns the signal temporally so that it can be processed according to transmission standards. Following alignment, the data is passed to a processing element 106 that removes the cycle prefix (CP) from the signal. Following that step, a serial to parallel conversion element organizes and converts the serial signal into parallel for further processing. The cycle prefix can be removed either before or after the serial to parallel conversion.

After CP removal 106 the parallel data is provided to a fast Fourier transform (FFT) processor 108 that converts the time domain samples s(n) to a set of frequency domain samples $R_j(k)$ for processing. The received OFDM symbol is assumed to be corrupted by the channel, which is assumed for OFDM to introduce amplitude and phase distortion to the values at each of the subcarrier frequencies used in the OFDM system. A frequency equalizer 110 can apply amplitude and phase correction specific to each of the subcarrier frequencies used in the OFDM system for the various samples transmitted on the different frequencies. The correction applied by the FEQ 110 preferably uses a channel estimate of the channel's amplitude and phase variations from ideal with the channel estimate preferably provided in the time domain. Certain preferred implementations of the FIG. 2 TDCE receiver determine a channel estimate for every received OFDM symbol. Other preferred implementations use statistical measures to provide robust functionality against known impairments. The equalized symbol output by the frequency equalizer 110 is provided to the decoder 380, which processes the symbol to extract the transmitted data. Appropriate decoders are known in the art.

The present inventors have observed that a mechanism limiting OFDM link performance is the assignment of erroneous subcarrier (tone) weights within the OFDM FEQ, which happens largely due to errors in channel estimation. To this end, the present inventors propose to implement in some preferred embodiments more robust channel estimation, as compared to the conventionally implemented interpolation in the frequency domain between pilots.

Portions of the FIG. 2 receiver preferably are selected to facilitate generating a time domain channel estimate. Pilot locations element 390 stores and outputs a set of pilot signal locations. Pilot locations element 390 may output pilot signal locations corresponding to the symbols and subcarriers that the appropriate communication standard dictates as having pilot signals. When desired, the pilot locations element 390 also outputs virtual pilot locations in addition to and preferably generated from the pilot signal locations dictated by the standards. The additional virtual pilot signals provide increased pilot signal stimulus that can be used by responsive elements to generate more accurate outputs, which can provide greater and desired stability particularly under certain conditions. Reference signal element 310 preferably is responsive to pilot location information output by pilot locations element 390 and more preferably is responsive to the actual and virtual pilot locations to generate a reference signal with increased pilot signal location stimulation. In some implementations, the pilot locations element 390 will output for each actual and virtual pilot location phase and amplitude information associated with those frequency domain actual and virtual pilots. Other circuitry such as the reference signal element 310 could provide one or more of these data sets, depending on how the circuitry is implemented and the sophistication of the implementation, or one or more of these data sets might not be needed in certain implementations. The reference signal generated by element 310 may be a time domain signal or may be a frequency domain signal as desired, including as preferred for the time or frequency selection of switch 305. The reference signal output by element 310 allows for correlations between the reference signal and either a time domain or a frequency domain received signal.

In certain preferred embodiments of an OFDM receiver, the receiver preferably selects a maximum channel impulse response (CIR) length for estimation that preferably is shorter than the OFDM symbol length. The symbol length is generally fixed for a particular system. The system may, in some preferred embodiments, select a portion of the initial CIR for further processing to develop a channel estimate or may otherwise achieve a channel estimate with a length shorter than the symbol length or the length of the initial CIR. Such preferred embodiments may, for example, utilize metrics that characterize the channel to advantageously determine a shortening of the initial symbol-length CIR that is beneficial to the time domain channel estimation in terms of complexity, robustness and accuracy. An appropriate metric might be generated, for example, by the iteration controller 350 or might be generated by another element of the FIG. 2 receiver responsive to the channel. Improvement in pilot information, for example by including virtual pilot locations estimated by the pilot location element 390, preferably is reflected in the quality of the statistical measure 320. Statistical measure element 320 in certain preferred receiver implementations can be used to provide a higher quality signal over a greater time span, so that a CIR selection module 330 preferably may be designed to truncate a CIR through an energy-optimizing method. Embodiments of the FIG. 2 receiver that combine two or more of these separately advantageous strategies may exhibit further advantages. For example, the serial processing of the illustrated arrangement of elements 310, 320 and 330 preferably may be implemented to increase the information, and its quality, from which the channel estimation element 340 produces its results. As discussed in further detail below, this represents a trade off between the noise and other variations in signal coupled into the system through a longer channel length used for estimation and the improved levels of energy used in the estimation.

Channel estimation element 340 preferably is at least capable of performing time domain channel estimation. Channel estimation element 340 may receive a time domain representation of the initial CIR (whether that initial CIR is developed in the time domain or developed in the frequency domain with the result transformed into the time domain) and preferably processes the initial CIR to develop a time domain channel estimate. As illustrated in FIG. 2, preferred switch 305 selectively couples a time domain signal (prior to FFT processing in FFT 108) or a frequency domain signal (after FFT processing in FFT 108) to various elements of the receiver including the statistical measure element 320. Consequently, in particularly preferred receiver implementations, the statistical measure element 320 is capable of selectively performing time domain or frequency domain channel estimation to develop the initial time domain CIR. Most of the advantages discussed here relate to use of a final time domain channel estimate within a receiver and so it is preferred that the channel estimation element 340 at least include time domain channel estimation capability based on an initial time domain CIR, where the receiver may determine the initial time domain CIR in part in the frequency domain. Certain embodiments preferably implement the estimation module 340 so that it is responsive to metrics, computed in the iteration controller 350, which in turn may be responsive to one or more or all of the modules 310, 320, 330. In still other embodiments, the iteration controller 350 may preferably further improve these metrics in response to error rate information preferably generated and provided by the decoder module 380 to the iteration controller 350 as feedback. Additional elements or circuits of the FIG. 2 receiver, such as the phase alignment element 360, padding element, FFT and averaging strategies element 370 are provided for further improvements, different aspects or different operational modes of the receiver. For example, certain elements or circuits are useful so that the channel estimate can be prepared for appropriate further processing according to whether a time domain or a frequency domain estimate is present at that point in the receiver. Preferred implementations of the FIG. 2 receiver may implement additional post-estimation elements or circuits to achieve computation or operational efficiencies.

For example, the phase alignment element 360 preferably is implemented as illustrated by FIG. 2 in the time domain but the phase alignment element can be implemented in the frequency domain even though such an implementation will include complex-value multipliers.

The receiver portion of FIG. 2 demonstrates improved performance with improved quality of the outputs from preferred implementations of elements 310, 320 and 330, and improved efficiency from iteration controller 350. Some or all of these elements may be included in implementations of the present invention, depending on the characteristics of the overall communication system. The receiver portion of FIG. 2 often includes two additional processing modules. Under many circumstances, the estimation module 340 does not provide a CIR that is properly aligned for equalization. Preferably then, the phase alignment module 360 is responsive to metrics from the iteration controller module 350 to properly adjust the CIR to match the frequency-domain phase of the corresponding OFDM symbol being processed by the TDCE receiver. Another circuit of the illustrated embodiment of a TDCE receiver is the averaging strategies element 370. Averaging strategies element 370 may also be responsive to metrics computed by the iteration controller module 350, which in turn may be responsive to information from the elements 310, 320, 330. The averaging strategies module 370 preferably provides a more accurate estimate of the channel frequency response (CFR) or channel impulse response (CIR) than can be obtained with an equivalent complexity in a FDCE Receiver.

Pilot and Virtual Pilot Signal Location Information

A simple frequency domain channel estimator for an OFDM system may interpolate between pilot signals across the frequency domain and within a single symbol to obtain the channel coefficients at the data subcarriers. Wireless communication standards such as WiFi or WiMAX dictate the locations of pilot subcarriers among all possible OFDM subcarriers in a symbol so that a receiver can incorporate and use this a priori known information in developing a channel estimate. Pilot tones or subcarriers may change locations from symbol to symbol in some standards. For those standards it may be advantageous to average unique pilot-bearing symbols to construct a "frequency domain time-averaged symbol." For instance, in WiMAX, the pilot locations are changed from symbol-to-symbol with a periodicity of four symbols. Thus, if one symbol has 60 pilots, then averaging over all symbols creates a composite spectrum of 4×60=240 pilots. A key assumption in averaging and using the averaged symbols is that the channel does not (significantly) change during the time span of the four symbols. This latter approach can be called a FDCE with time domain pilot averaging. This time-domain averaging of frequency-domain OFDM symbols is not to be confused with time-domain processing to estimate the channel, as described more fully below.

In other standards, such as long term evolution or LTE, the pilot-bearing symbols can occur in non-contiguous symbols. For example, a sub-frame with duration of 0.5 ms may consist of 14 OFDM symbols. The pilots in a particular operating mode may be located in symbols 0, 4, 7 and 11. Averaging over four symbols can be performed, as previously described, or other techniques formulated and used to estimate the channel for non pilot-bearing symbols. For example, determining such channel coefficients for data-only symbols could be accomplished using a simple interpolation computation. These techniques are for time-domain averaging of pilots and do not accomplish time-domain channel estimation, in contrast to the channel estimation element 340, which does perform time-domain channel estimation.

In the FDCE OFDM discussion above, where symbol averaging is performed across time with frequency-domain estimates, time-domain averaging occurs on the modulated subcarriers after the signal is subjected to FFT (i.e., post-FFT). A TDCE receiver may find it advantageous to adopt such time-domain pilot averaging, with the pilot information in some circumstances further manipulated and transformed to the time domain for use in relevant computations.

Some particularly preferred implementations of a TDCE OFDM receiver according to the present invention extend the number of pilots in any pilot-bearing symbol through the generation or determination of virtual pilots. In preferred implementations, the method of virtual pilots is to locally, at the receiver, determine or generate additional (virtual) pilots which are, at a minimum, placed at locations other than existing pilots. Often, at least some of the virtual pilot locations are defined at frequencies (or subcarrier locations) in between existing pilot locations. It may also be advantageous to compute virtual pilots beyond the subchannels that have been allocated. Preferably the pilot locations module 390 stores and outputs the information for actual pilot locations, as defined in the standard, which can vary as specified in the standard. Furthermore, the pilot locations module 390 preferably also stores or determines and outputs preferred or particularly advantageous virtual pilot locations. The virtual pilots may be located in between existing pilot locations, or extended to subcarrier locations outside any given defined OFDM symbol subchannel. Preferably the element 390 has three sets of indexes to define three classes of subcarriers {pilots, data, virtual}.

Determinations of the virtual pilots can be effected, for example, through various techniques that determine interpolated values of a sampled function. Indeed, the creation of virtual pilots is akin to the problem of up-sampling a time waveform, which can be done through linear interpolation or through more sophisticated calculations involving B-spline functions. Those skilled in the art can determine the interpolation method that best suits the complexity constraints in their TDCE receiver design, and/or that achieves the maximum realizable performance with respect to error rate measures on the received symbol. The pilot location element 390 can determine the virtual pilot locations, for example through B-spline interpolation based on the standard-dictated pilot locations, or the pilot location element 390 can store the results of an earlier determination of the virtual pilot locations. As discussed above, the virtual pilot locations might also be determined more simplistically according to the actual pilot locations and the pilot locations element 390 may determine appropriate phase and amplitude information for the virtual pilots based on the determined virtual pilot locations.

Ephemeral data about the network state, receiver configuration, and estimation parameters are used as "global variables" throughout the illustrated communication system. These include, but are not limited to, the FFT size and the channel estimation length. Each element in FIG. 2 specifies the applicable parameters within the description for the respective preferred embodiment.

A TDCE receiver preferably is designed to have numerical stability under most operational conditions and preferably is able to estimate the channel over a given number of samples. These desirable conditions may present challenges in implementing a TDCE receiver because the existing standards, which focus on FDCE, do not guarantee either condition to be possible for TDCE in OFDM receivers. Numerical stability is particularly preferred when signal processing includes matrix-vector multiplication, as can be found in many preferred implementations of the present invention. Ill-conditioned matrices may cause an increase in bit-widths due to insufficient support for the size of the matrix. This sensitivity is measured in terms of the eigenvalue spread, and a high spread may point to trouble in inverting a matrix. For any matrix formed from the pilot subcarriers of a symbol, if there is an insufficient number of pilots relative to the matrix dimension, then the matrix will be ill-conditioned, which can potentially create numerical instability or unsustainable bit-width growth.

Another concern with too few pilots in a symbol is the periodicity of the time sequence, which will be related to the number of pilots in the symbol. For example, if there are 64 pilots in any given symbol, estimating a channel for 256 lags may become inaccurate due to periodicity or harmonics related to the number of pilots in the given symbol. To improve numerical properties of matrices and to achieve a CIR estimation of length greater than the number of transmitted pilots in a symbol, preferred receiver implementations use virtual pilots and, preferably, actual pilots in generating a reference signal. The number of virtual pilots preferably is such that Np+Nvp>estimation length, where Np is the number of standard-dictated pilots, Nvp is the number of virtual pilots and estimation length is the number of samples used for the channel estimate, and the receiver preferably generates a reference symbol with quasi-equally spaced pilots across the symbol's bandwidth. Estimation length is preferably a variable in implementation os the FIG. 2 receiver. Preferably then, the virtual pilot locations are defined by a procedure such as, set pilot_locations {virtual} to be Nvp equidistant locations between existing pilot locations, or a functionally similar procedure. The pilot locations element 390 preferably generates the phase and amplitude for those Nvp locations using, for example, a B-spline strategy.

Reference Signal Generation

Preferably the reference signal module 310 produces an output reference signal that results in a computationally efficient correlation with the actual received signal in the statistical measure module 320. The choice for the output is dependent on the choice at the switch 305. If the switch 305 is set to "t" then the correlation computation in the statistical measure module 320 will be computed as a time-domain summation. If the switch 305 is set to "f", then the computation of a long-correlation more preferably is computed in the frequency domain. Those skilled in the art can determine the most computationally efficient method for a correlation given a trade-off in the complexity between a direct-computation (time-domain) determination or an FFT determination. Longer correlations are more efficiently determined in the frequency domain. In the illustrated preferred embodiment, the reference signal module 310 is responsive to the switch selection sense to output the corresponding time domain or frequency domain reference signal.

Preferably the reference signal is selected (or designed) to mimic the modified input symbol to which the statistical measure element 320 is responsive. In part that makes it preferable that the reference signal be selected as a time domain or a frequency domain signal as appropriate to the form of the OFDM signal to be correlated. In addition, the reference signal preferably provides pilot locations at those locations useful in performing the correlations of statistical measure element 320. The pilot locations to which the reference signal element 310 is responsive preferably are enhanced to include the virtual pilot locations to be used within the statistical measure element 320. The pilot locations element 390 preferably defines the locations for the existing pilots at the input to elements 310 and 320 and preferably also sets the locations of all virtual pilots, whether they are positioned in between existing pilots or outside well-defined subchannel carriers.

Therefore, the reference signal module 310 preferably implements the following procedure or a similar procedure:

---
Procedure: Reference_Signal
---
```
 1 input: switch_state { t, f };
 2 input: pilot_locations { standard, virtual };
 3 array: pilots (size_FFT)= 0;
 4 set pilots( pilot_locations )= +1;
 5 if switch_state = t then
 6     reference_signal= inverseFFT( pilots );
 7 else
 8     reference_signal= pilots;
 9 end
10 output: reference_signal;
```
---

Consequently, when a time domain reference signal is to be generated for correlation with a time domain symbol, the reference signal element 310 preferably assembles a symbol with non-zero values at the actual and virtual pilot locations and performs an inverse fast Fourier transform to generate an appropriate reference signal. Preferably the reference signal element 310 assigns zero values to the data subcarriers that are distinct from the virtual pilot subcarriers. The value of size_FFT, which is set as the number of samples in the data set to be transformed, is a fixed global value known a priori for example from an applicable standard.

Translation of pseudocode like that above and elsewhere in this document into circuitry is within the capabilities of persons of ordinary skill in this art. It will be appreciated that this procedure could be implemented through software in a processor or it could be implemented in circuitry in combination with memory. Where desirable or advantageous, the procedures discussed in this patent document can be implemented as hardware through, for example, a hardware design language. Alternately, the above procedure, as well as the other procedures and methods described here can be readily implemented in a digital signal processor or a processor that processes communication signals within a communication system. Those of ordinary skill will appreciate that the receiver described here can be implemented in a mixture of hardware and software elements as selected to achieve different objectives such as computational efficiency and power efficiency.

Preferred implementations of the reference signal element 310 may incorporate the procedure Reference_Signal, which illustrates a method responsive to the switch 305 state and the output of pilot locations element 390. Switch 305 indicates whether the correlations are done in the time domain or in the frequency domain and so is used by the reference signal element 310 to determine whether element 310 outputs a time domain or frequency domain reference signal. The CIR selection 330 may advantageously be responsive to inputs generated in the frequency domain, even though its operation and output is a CIR for time domain channel estimation. The outputs of the pilot locations element 390 may include the pilot locations specified in the selected or applicable standard and the location of virtual pilots determined or stored by the pilot locations element 390. In the case of a time-domain reference signal, then the pilot locations array is the input to an inverse FFT computation. Otherwise, the reference signal output is simply the frequency domain symbol with the pilot subcarriers active, and the data subcarriers set to zero.

Those skilled in the art can specify the mapping that the standard may impose on the pilot locations for the proper pilot subcarriers to be set to "+1". Also, those skilled in the art can determine if the value "+1" is the correct pilot value, depending on the specified modulation and how the receiver modifies the FFT output.

Correlations and Statistical Measures

The statistical measure element 320 preferably determines the statistical metrics and measurements that are provided to the estimation element 340 to compute the channel estimate. As shown in FIG. 2, the statistical measure element 320 is coupled to the switch 305 that identifies whether the statistical measure element 320 is to correlate a time domain or a frequency domain OFDM signal.

Two signals preferably are used to compute statistical measures and metrics. Statistical measure element 320 preferably is responsive to a reference signal, such as that from the reference signal module 310, and the input OFDM symbol received from the channel. As shown in FIG. 2, the statistical measure element 320 preferably is coupled to the pilot locations element 390, which identifies what virtual and standard-dictated pilot locations are to be used by element 320, is preferably coupled to the reference signal element 310, which provides the reference signal to be used for correlation, and is preferably coupled to the switch 305 that provides the appropriate time domain or frequency domain form of the OFDM signal to be correlated. It is possible to generate a reference signal only for the known pilots and correlate it when there is a training symbol at the input to the statistical measure module 320. More preferred implementations of the statistical measure module 320 utilize a modified reference signal that incorporates actual pilots at standard-dictated locations and virtual pilots at locations different from but preferably derived from the standard-dictated pilots.

For any given input OFDM symbol, the statistical measure element 320 preferably will reduce the power of all the data subcarriers, determine the desired reference signal properties for the virtual pilot locations, and correlate the modified OFDM symbol with the reference signal preferably provided by element 310. In a particularly preferred implementation the statistical measure element 320 sets the value of the data subcarriers to zero by setting a weighting value for those subcarriers to zero. The amplitudes assigned to the virtual pilot locations preferably are determined from amplitudes of standard-defined pilot locations through, for example, interpolation. The element 320 preferably computes the correlation for a pre-defined number of "lags," where the number of lags is chosen advantageously to include more coefficients than the expected channel length. To minimize computational complexity, the statistical measure element 320 can effect the correlation through a direct computation, in the time domain, or via well-known techniques involving FFT computations. Those skilled in the art can make the corresponding trade-off to proceed with computational efficiencies.

Preferably, the statistical measure element 320 is responsive to a reference signal and a copy of the OFDM symbol under consideration, and converts the OFDM symbol to a facsimile of a pilot-only symbol. This converted pilot only symbol is referenced here as the training symbol facsimile (TSF). That is, the statistical measure element 320 preferably converts the mixed symbol of pilots and data subcarriers into a training symbol facsimile with a plurality of actual and virtual pilots, and efficiently computes a correlation of the training symbol facsimile against the reference signal. The conversion from mixed pilot and data OFDM symbol to pilot and virtual pilot training symbol facsimile preferably is effected in the frequency domain, and the element 320 subsequently converts the training symbol facsimile into the time domain (via an inverse FFT), or provides the training symbol facsimile directly in the frequency domain for the frequency domain correlation, depending on the most computationally efficient choice.

The statistical measure module 320 preferably implements the following procedure or a similar procedure:

---
Procedure: Statistical_Measure
---
1  input: switch_state { t, f };
2  input: pilot_locations { standard, virtual, data };
3  input: ofdm_symbol;
4  input: reference_signal;
5  array: training_symbol_facsimile (size_FFT)= 0;
6  set data_weighing= 0;
7  set number_correlation_lags= estimation_channel_len + estimation_channel_guard;
8  at pilot_locations { standard };
      set training_symbol_facsimile= ofdm_symbol values;
9  at pilot_locations { virtual };
      set training_symbol_facsimile= interpolate( training_symbol_facsimile{ standard });
10 at pilot_locations { data }:
      set training_symbol_facsimile= ofdm_symbol values × data_weighing;
11 if switch_state = f then
12     initial_long_channel_estimate= correlate via FFT the reference_signal with training_symbol_facsimile for a number_correlation_lags;
13 else
14     initial_long_channel_estimate= correlate via direct computation the reference_signal with training_symbol_facsimile for a number_correlation_lags ;
15 end
16 output: initial_long_channel_estimate;
17 output: number_of_correlation_lags;

---

Estimation_channel_len, estimation_channel_guard and size_FFT values are fixed global values known a priori. The statistical measure procedure can be implemented in software in a communications processor or it can be implemented in hardware including logic and memory.

The procedure Statistical_Measure preferably determines an initial channel estimate based on the correlation of the reference signal and the training symbol facsimile, which is derived from the relevant OFDM symbol. The initial channel estimate is the channel impulse response or CIR and, for many applications, is not sufficiently accurate to equalize the relevant OFDM symbol. The statistical measure element 320 preferably also outputs the number of correlation lags to reach a peak correlation value determined through the statistical measure procedure. In preferred implementations of the FIG. 2 receiver, this initial CIR preferably is improved or utilized by the estimation module 340 to determine a final CIR. Preferably, before the estimation module 340 uses the initial CIR, the CIR preferably is truncated to the set value for estimation_channel_len by discarding estimation_channel_guard samples. This is because the correlation computation that leads to the initial channel estimate (initial CIR) is longer than the specified length for CIR estimation.

CIR Truncation

The CIR selection module 330 preferably provides a method to select a CIR sample set with a smaller number of samples than the initial CIR estimate. For example, the selected sample from the initial CIR could be selected to include a first path having amplitude above a threshold level, a number of samples before that first path and a number of subsequent samples that preferably include the paths with amplitudes above a desired threshold including what may be termed the last path. Preferably the selected CIR sample set has a number of samples below the number of samples in a symbol, which is particularly advantageous for CIR estimating using statistical methods that improve on an initial estimate performed in the estimation module 340 and for reducing complexity. Thus, the CIR selection module 330 is responsive to an initial channel estimate, which exceeds the specified estimation length and often is determined from a correlation such as that performed by the statistical measure element 320, and specifications for the truncation method. Preferably, the CIR selection element 320 evaluates a CIR to identify a desirable portion, for example, by identifying a set of n consecutive values that contain a maximum summed power for any set of n consecutive values. From within this selected window of n consecutive values, the CIR selection element 320 might, for example, identify a peak power value and then select a number of values to keep before and generally a different number of values to keep after the peak value, preferably defining that set of values around and including the peak value to be the truncated CIR.

The CIR truncation preferably is determined by a criterion that maximizes the energy confined to estimation_channel_len samples. The CIR selection module 330 preferably determines a desired significant sample set by exploiting a property of wireless channels of exhibiting a small pre-amble of paths before the first significant path is identified, and an exponentially decaying power profile for delays after the first path. This procedure preferably maximizes the accuracy and convergence speed of the preferred estimation module 340 strategies. Preferably, the CIR selection module 330 defines a sliding window of estimation_channel_len samples to compute a norm over the window. Preferably, this norm is the sum-of-squares of samples in the window, though those skilled in the art may find suitable approximations to this norm or other well-defined norms and their corresponding approximations, to offer suitable results.

As the CIR selection module 330 is responsive to a CIR from the statistical measure module 320 (initial_long_channel_estimate) with number of correlation_lags samples, there will be an intermediate result of estimation_channel_guard samples normed measurements. The CIR selection method searches these normed measurements to signal the beginning of the CIR with estimation_channel_len samples. This search preferably identifies the start of a CIR via a power threshold identification method. This threshold preferably is set as a value above the mean of the maximum power measured over all possible windows of estimation_channel_len samples selected from the initial_long_channel_estimate. Because the received power can be relative, the power threshold preferably is set as a scaling factor, rather than as an absolute value. Those skilled in the art may identify a suitable scaling factor to produce a reliable identification of the initial path.

To account for synchronization and other alignment errors, the method for CIR selection also includes a bias from the location of maximum energy, to include a pre-amble to the initial path. Those skilled in the art can identify a bias that is advantageous to the particular properties, such as a channel power profile, for the channel under consideration. In other words, the selection element preferably identifies a peak position and selects a number of bits before and after that position to make up the selected or truncated CIR input. Preferably, the CIR selection element 340 performs a procedure such as that below, or a similar procedure.

| Procedure: CIR Selection |
|---|
| 1  input: initial_long_channel_estimate; |
| 2  array: initial_channel_estimate= 0; |
| 3  array: window_power( estimation_channel_guard )=0 |
| 4  set length_long_channel= size( initial_long_channel); |
| 5  for norms_index = 0 to (estimation_channel_guard−1) |
| 6      window_index=[1:estimation_channel_length] + norms_index; |
| 7      window_power( norms_index )= power norm of initial_long_channel_estimate( window_index ); |
| 8  end for |
| 9  set max_window_power= find( 'max', window_power ); |
| 10 set cir_start_threshold= cir_threshold_scale × max_window_power; |
| 11 set cir_offset_peak= first occurrence of \|initial_long_channel_estimate\|$^2$ > cir_start_threshold; |
| 12 set cir_offset= cir_offset_peak − cir_start_bias; |
| 13 set initial_channel_estimate= initial_long_channel_estimate indexed from [1:estimation_channel_len]+ cir_offset; |
| 14 output: initial_channel_estimate; |
| 15 output: cir_offset; |

Here, the cir_offset output can be used to synchronize the CIR value output by the channel estimation element 340 with the OFDM symbol of concern. In the illustrated embodiment of FIG. 2, this is accomplished in the phase alignment element 360. The values of estimation_channel_len, cir_threshold_scale, cir_start_bias are fixed global values known a priori. The CIR selection procedure can be implemented in software in a communications processor or it can be implemented in hardware including logic and memory.

Phase Alignment of the Channel Estimate

The process of selecting the CIR with the highest level of energy, or power, preferably facilitates operation of the channel estimation element 340. This CIR selection does not, however, consider the already-established time synchronization of the relevant OFDM symbol as determined by other functional elements in the receiver of FIG. 2. Therefore, preferred implementations of the FIG. 2 receiver preferably include a phase alignment element 360 that properly sets up the CIR relative to the relevant OFDM symbol, which has already been synchronized by external elements in the TDCE receiver. The phase alignment module 360 preferably adjusts the CIR to re-synchronize the time domain channel estimate with the equivalent that would be calculated in the frequency domain, such as by an FDCE that interpolates between pilot locations. This equivalence functionally introduces a phase shift at each subcarrier. The phase alignment element 360 is responsive to the CIR, in the signal final_channel_estimate from the estimation module 340 which has estimation_channel_len samples, and the value of the offset from the first path in the window selection of the initial_channel_estimate from the CIR selection module 330—noted by the signal cir_offset—and preferably determined by circuitry or a processor implementing the CIR selection procedure discussed above.

The CIR phase alignment preferably performs a circular shift on the estimation module 340 output (final_channel_estimate). This operation is a left-circular shift by cir_offset samples and phase alignment element 360 preferably accomplishes the alignment through the following procedure or a similar procedure.

| Procedure: Phase Alignment |
|---|
| 1  input: final_channel_estimate; |
| 2  input: cir_offset; |
| 3  array: aligned_cir (size_FFT)= 0; |
| 5  aligned_cir= left circular shift of final_channel_estimate by cir_offset samples; |
| 6  output: aligned_cir; |

The value of size_FFT is a fixed global value known a priori. The phase alignment procedure can be implemented in software in a communications processor or it can be implemented in hardware in the known manner.

After phase alignment, the channel estimate is extended or padded to have a proper length for further processing. For example, padding element 362 may insert trailing zeros to make the channel estimate have the proper length. Next the fast Fourier transform element 364 transforms the channel estimate to the frequency domain for use by the frequency equalizer 110.

Iteration Control

Preferred embodiments of the FIG. 2 receiver incorporate an iteration controller to control the number of iterations of the channel estimation element 340. Preferably the iteration controller element 350 receives and considers information from one or more of the decoder element 380, which preferably outputs post-equalizer quality measurements, the CIR selection element 330, which outputs an initial channel estimate, the statistical measure element 320 and the channel estimation element 340. The iteration controller element 350 and the estimation element 340 preferably work in conjunction to achieve desired channel estimation performance, under varying pilot configurations in training and/or pilot/data mixed symbols. The iteration controller element 350 is advantageous to computational methods that exploit second order moment measures, such as correlations and auto-covariance matrices for channel estimation in channel estimation element 340. Direct computations of these formulations are comparatively less likely to be numerically stable, and thus iteration methods preferably are employed. For this reason, metrics and other quality measures preferably are processed to determine a sufficient number of iterations or, for example, a maximum number of such iterations.

The sequential processing from the reference signal element 310, statistical measure element 320 and CIR selection element 330 produces an initial channel estimate with the target number of coefficients and preferably maximizes a selection criterion. The statistical measure is preferably a cross-correlation between the input symbol and the reference signal and preferably generates second order statistical measurements from that correlation. The initial channel estimate and the second order statistical measurements are preferably input to channel estimation element 340 and preferably input to iteration controller 350.

The channel estimation element 340 may, for example, implement the channel estimation improvement strategies described in U.S. patent application Ser. No. 12/365,805, "Least Square Channel Identification for OFDM Systems," filed Feb. 4, 2009, which application is incorporated by reference in its entirety for its teachings with respect to channel estimation and OFDM signal processing. Channel estimation element 340 preferably implements a statistical estimation strategy for improving on the initial channel estimate provided by the statistical measure element 320. One known strategy for performing statistical estimation uses an optimum linear estimator formulation of the Wiener-Hopf equation, which can calculate a best unbiased estimation of an unknown parameter based on second order statistics from cross-correlation and auto-correlation statistical measures. Other strategies are known for using statistical measures to estimate an unknown parameter, including various computational linear, and non-linear, estimation strategies.

Denoting the output of the CIR selection element 330 by the vector $h_0$, the channel estimation element 340 preferably improves on this initial estimate, using information from second order statistics, preferably through an iterative procedure. In a preferred implementation of FIG. 2, the iterative estimation in 340 will compute, and subtract from the initial estimate, a correction vector c to produce an improved estimate output $h=h_0-c$. This procedure may be called an "additive inverse." An alternate iterative procedure is termed "conjugate gradients." Both the additive inverse and the conjugate gradient strategies offer an approximation to the optimum linear estimator for the unknown parameter h, given an initial estimate $h_0$ and additional parameters such as second order statistical measures.

A non-linear estimation strategy that works with similar inputs to the additive inverse and conjugate gradients strategies and is suitable for the characteristics of wireless channel estimation, is the compressive sensing (sampling) strategy such as determined through one of the matching pursuit class of iterative procedures. Formulations of the compressive sensing/matching pursuit class of channel estimators are described in the literature and operate under idealized assumptions about the inputs. FIG. 2 provides an interface and formatting that facilitates implementation of these compressive sensing/matching pursuit strategies in a practical OFDM receiver that works with the imperfections and variations encountered from symbol-to-symbol in wireless channels.

Iterative channel estimation strategies generally are implemented to use the output of CIR selection element 330 to conform to conventionally adopted, idealized assumptions for these strategies. Elements 310, 320 and 330, as discussed above, provide a preferred set of inputs to the channel estimator 340 so that it can provide a desired level of estimation accuracy. In addition to the initial channel estimate, the CIR selection element 330 passes other second order statistical measurements—such as the auto-covariance matrix—and iteration control variables preferably used in various estimation improvement strategies implemented within the channel estimation element 340.

Iteration controller 350 preferably determines the additional signals and values that are inputs used in determining the channel estimation in estimator 340. When the channel estimation element 340 implements an additive inverse strategy, the iteration controller 350 preferably performs a pre-determined (via simulations) fixed number of iterations to perform before the vector c is computed and this fixed number of iterations is used as a stopping criteria. Different stopping criteria may be implemented depending on the application, as known in the art. Fundamental to the additive inverse procedure, as well as the conjugate gradients and compressive sensing/matching pursuit iterative procedures, is for the iteration controller 350 to compute the auto-covariance matrix for input to the channel estimation element 340. In the case of conjugate gradients, as with the additive inverse iterative procedure, there are suitable stopping criteria formulations known to those working in this field.

Channel estimation element 340 preferably operates with the iteration controller 350 to implement an iterative procedure to determine an improved channel estimate. Channel estimation element 340 preferably implements at least a portion of an iterative procedure that uses as inputs: a CIR initial estimate, provided by the operations of elements 310, 320 and 330; additional second order statistics, preferably including an auto-covariance matrix; and an iteration stopping value based on a criterion computed, determined or stored within the iteration controller 350. The functional separation discussed here and illustrated in FIG. 2 is for illustration purposes to aid in understanding the TDCE, but the physical design may distribute and/or segment the procedures among the elements as it is most advantageous for hardware or software implementation.

Iteration controller 350 also determines values dependent on the choice of iterative algorithm in channel estimation element 340 to dynamically determine the stopping criteria. An example of this is illustrated by the additive inverse procedure which is preferably configured to stop after a pre-determined number of iterations, while compressive sensing/matching pursuit procedures may have a more complicated formulation of its stopping criterion. Thus, the iteration controller 350 is responsive to the pertinent signals from the channel estimation element 340, which advantageously provides iteration controller 350 with the internal values of the iteration calculations to determine the stopping criterion values. Channel estimation element 340 preferably provides the iteration controller 350 the final channel estimation vector.

An illustrative implementation of the compressive sensing/matching pursuit procedure operating within the channel estimation element 340 is summarized in the pseudocode set out below. As with the other pseudocode in this document, the below pseudocode can be implemented in software within a communications processor or in hardware or in a combination of software and hardware.

Procedure Estimation (Compressive Sensing/Matching Pursuit)

```
0.  input: stopping_criterion_logical, dictionary_matrix,
        pilot_values_vector;
1.  initialization: stopping_criterion_logical = 1; h=0;
        t_vector= pilot_values_vector;
2.  while stopping_criterion_logical do
3.      criterion_vector = dictionary_matrix*t_vector;
4.      max_criterion_location_scalar = argmax[i] over
            all |criterion_vector[i]|²;
5.      chanest_vector[ max_criterion_location_scalar ]=
            chanest_vector[ max_criterion_location_scalar ]+
            criterion_vector[ max_criterion_location_scalar ];
6.      t_vector= t_vector –
            criterion_vector[ max_criterion_location_scalar ]*
            dictionary_matrix[all rows,
                max_criterion_location_scalar column];
7.      output: criterion_vector;
8.      input: stopping_criterion_logical;
9.  endwhile
10. output: chanest_vector
```

In steps 7 and 8, the channel estimation element 340 preferably outputs the criterion_vector to the iteration controller 350 so that the iteration controller can determine if the iterations are to be stopped. Dictionary_matrix is determined according to the specific implementation as known in the art.

An illustrative implementation of the compressive sensing/matching pursuit procedure operating within the iteration controller element 350 is summarized in the pseudocode set out below. As with the other pseudocode in this document, the below pseudocode can be implemented in software within a communications processor or in hardware or in a combination of software and hardware.

Procedure Iteration Controller (Compressive Sensing/Matching Pursuit)

```
0.  input: criterion_vector; pilot_values_vector; criterion_selection,
        iteration_count, iteration_max,
        criterion_value_threshold, initial_chanest;
1.  if( iteration_count > iteration_max ) then
2.      stopping_criterion_false= 0;
3.  else
4.      metric_on_criterion_value=
            function_criterion(criterion_vector, initial_chanest);
5.      if ( metric_on_criterion_vector <
            criterion_value_threshold ) then
6.          stopping_criterion_logical = 0;
7.      else
8.          stopping_criterion_logical = 1;
9.      endif
10. endif
11. output: stopping_criterion_logical;
```

Pilot_values_vector is preferably provided by the statistical measure element 320 based on a preferred implementation including virtual pilots. The function_criterion computes a pre-determined metric's value based on the criterion_vector. Preferably, this metric relates to the magnitude of its maximum element, or a partial sum of the magnitude squared of its elements, or a complete sum of the magnitude squared of its elements. Similar metric determination can be implemented based on expected channel behaviors and tested via simulations. Other metrics may be responsive to the counting of significant paths in the initial_chanest to adjust the metric's values.

Preferably, the iteration controller 350 advantageously uses the final CIR estimation (from element 340) to compute metrics that are provided to the phase alignment element 360 and averaging strategies element 370, which use the metrics to further increase their computational accuracy. The averaging strategies element 370 may, for example, use metrics measured in the time domain for improved data-symbol channel interpolation. Averaging strategies element 370 may be responsive to outputs from the iteration controller 350 based on estimates of the doppler frequency in the received symbol and/or the signal to noise ratio (SNR) of the received symbol derived from the time domain CIR and may use this estimate or estimates for improved data-symbol channel interpolation. These metrics derived from the CIR offer increased accuracy over well-known computations in the frequency domain computed from an OFDM symbol. Some implementations of the iteration controller 350 are responsive to determinations of the CIR output by element 330, so that the iteration controller 350 outputs measured values to the averaging strategies element 370 or outputs pre-determined fixed values in case of unreliable conditions in the channel.

Channel Estimation Averaging or Interpolation and Extrapolation Strategies

Receivers implementing advanced wireless communication standards collect a number of symbols into frames and sub-frames. The user's information transmitted from a base station will be spread over a number of symbols that at least constitute a sub-frame. In the case of LTE, the downlink is segmented into a collection of frames during the transmission period, and the user may have information bits spread over a number of frames, or within a sub-frame, as the frame is divided into two sub-frames, of five milliseconds each. These sub-frames are the smallest unit of channel estimation for this illustration of a presently preferred LTE communication system. Within a sub-frame of fourteen symbols, only four symbols have pilots. Channel estimation, whether by FDCE or TDCE, requires pilots to calculate a corresponding channel estimate. Thus, the ten data-only symbols in a sub-frame do not have channel estimation performed on them. Operating according to standards that embody these definitions, or definitions like them, forces a receiver to use estimates based on the sparse pilot-bearing-symbol subcarriers to estimate the channel for symbols consisting of data-only subcarriers. Various strategies exist to interpolate values between two known values, generally known as interpolation filters. Well-known techniques for interpolation in communications systems include the use of linear interpolation and splines with varying degrees of accuracy and complexity depending on the nature of the signal properties.

Preferred receiver implementations of the present invention may use interpolation and, in some cases, extrapolation as an averaging strategy to calculate channel coefficients on data-only subcarrier symbols in the frequency domain, allowing channel estimation for data-only symbols that achieves low-complexity and high accuracy. In the FIG. 2 receiver, the averaging strategies element 370 may in some embodiments preferably implement interpolation and extrapolation functions to estimate the channel for data-only subcarriers based on channel estimates derived in the time domain from pilot-bearing symbols. While the illustrated receiver offers the capability to achieve a highly accurate channel estimate in the time domain, preferred embodiments preferably interpolate the channel estimate for data-only subcarriers in the frequency domain. The power variations of the channel's coefficients from one symbol to another may have a lower dynamic range of values in the frequency domain representation of the channel making processing simpler. Furthermore, a given user is assigned a number of subcarriers in the entire OFDM symbol, thus the interpolation of the frequency domain channel estimate may be applied across a small number of subcarriers and across fourteen symbols in the case of LTE, thus greatly reducing the two-dimensional grid for interpolation.

In some preferred embodiments, averaging strategies element 370 averages channel estimates to improve their accuracy and reliability. As shown in FIG. 2, averaging strategies element 370 preferably is coupled to receive aligned, padded and transformed (i.e., frequency domain) versions of the channel estimates determined by, for example, channel estimation element 340. Averaging channel estimates in pilot-bearing symbols to obtain channel estimates for data-only symbols preferably accommodates both interpolation and extrapolation. Extrapolation offers improved performance for sub-frames at the end or beginning of a frame, or when previous or subsequent sub-frames are not available to the receiver for implementation reasons.

In one example for the LTE standard, the pilot-bearing symbols are located at symbols indexed {0, 4, 7, 11} out of 14, which are indexed in totality as {0, 1, 2, 3, 4, 5, 6, 7, 8, 9, 10, 11, 12, 13}. In this example, a preferred receiver embodiment of the present invention interpolates the values for frequency domain channel coefficients for symbols indexed {1, 2, 3, 5, 6, 8, 9, 10} and implements an extrapolation scheme for symbols indexed by {12, 13}. A preferred embodiment of the present invention to effect this calculation of channel estimates for the data-only symbols is given in the pseudocode that follows.

Procedure: LTE_CASE_AntennaPort_0_1 (normal CP)
1. For each symbol, assign the (fd_chan_est) using the following formulation based on the current time domain channel estimates (tdce_chan_est) and, if available, the next sub-frame's time domain channel estimates (next_tdce_chan_est).

| symb_idx | channel_estimate | calc_type |
|---|---|---|
| 0 | fd_chan_est(0) = FFT[tdce_chan_est(0)] | TDCE Estimate |
| 1 | fd_chan_est(1) = FFT[tdce_chan_est(0)]*¾ + FFT[tdce_chan_est(4)]*¼ | interpolation |
| 2 | fd_chan_est(2) = FFT[tdce_chan_est(0)]*½ + FFT[tdce_chan_est(4)]*½ | interpolation |
| 3 | fd_chan_est(3) = FFT[tdce_chan_est(0)]*¼ + FFT[tdce_chan_est(4)]*¾ | interpolation |
| 4 | fd_chan_est(4) = FFT[tdce_chan_est(4)] | TDCE Estimate |
| 5 | fd_chan_est(5) = FFT[tdce_chan_est(4)]*⅔ + FFT[tdce_chan_est(7)]*⅓ | interpolation |
| 6 | fd_chan_est(6) = FFT[tdce_chan_est(4)]*⅓ + FFT[tdce_chan_est(7)]*⅔ | interpolation |
| 7 | fd_chan_est(7) = FFT[tdce_chan_est(7)] | TDCE Estimate |
| 8 | fd_chan_est(8) = FFT[tdce_chan_est(7)]*¾ + FFT[tdce_chan_est(11)]*¼ | interpolation |
| 9 | fd_chan_est(9) = FFT[tdce_chan_est(7)]*½ + FFT[tdce_chan_est(11)]*½ | interpolation |
| 10 | fd_chan_est(10) = FFT[tdce_chan_est(7)]*¼ + FFT[tdce_chan_est(11)]*¾ | interpolation |
| 11 | fd_chan_est(11) = FFT[tdce_chan_est(11)] | TDCE Estimate |

2. if the next subframe is present then:

| symb_idx | channel_estimate | calc_type |
|---|---|---|
| 12 | fd_chan_est(12) = FFT[tdce_chan_est(11)]*⅔ + FFT[next_tdce_chan_est(0)]*⅓ | interpolation |
| 13 | fd_chan_est(13) = FFT[tdce_chan_est(11)]*⅓ + FFT[next_tdce_chan_est(0)]*⅔ | interpolation |

3. else if the next subframe is not present then:
rise_chan_est=FFT[tdce_chan_est(11)]−FFT[tdce_chan_chan_est(7)];
run=11−7=4
extrapolation_adjustment=rise_chan_est/run;

| symb_idx | channel_estimate | calc_type |
|---|---|---|
| 12 | fd_chan_est(12) = FFT[tdce_chan_est(11)] + 1*extrapolation_adjustment | extrapolation |
| 13 | fd_chan_est(13) = FFT[tdce_chan_est(11)] + 2*extrapolation_adjustment | extrapolation |

The illustrated interpolation is based on the two nearest time-domain channel estimates, one in the past and the other in the future. The weighting is generally chosen to be symmetric according to the distance to the nearest channel estimate. For a finite word precision implementation, the irrational values (e.g., ⅓, ⅔) are to be approximated based on the design logic and affordable complexity. Because future estimates preferably are used, as in the case of symb_idx=2, the receiver preferably includes a buffering system to allow for interpolations based on four time domain channel estimates, their transformation to the frequency domain, and their assignments according to the preferred implementation detailed in the preceding procedure. Those skilled in the art can design strategies to assign the usage of available memory to buffer and store the information as prescribed in the above procedure.

Those skilled in the receiver design art for LTE may determine a preferred control scheme for the averaging strategies element based on the availability of previous and next sub-frames, depending on the location of the current sub-frame in the transmission, and if the implementation has been designed to take advantage of these neighboring sub-frames through proper buffering and indexing capabilities.

A preferred implementation in which extrapolation preferably is implemented for the first symbol is shown in the following pseudocode. In this example, the pilot-bearing symbols are indexed as $\{1, 8\}$ only, with a complete indexing of the 14 symbols as before.

Procedure: LTE_CASE_AntennaPort_2_3 (normal CP)
1. for each symbol, assign the (fd_chan_est) using the following formulation based on the current time domain channel estimates (tdce_chan_est) and, if available, the next sub-frame's time domain channel estimates (next_tdce_chan_est) as well as the previous sub-frame's time domain channel estimates (prev_tdce_chan_est).

| symb_idx | channel_estimate | calc_type |
|---|---|---|
| 1 | fd_chan_est(1) = FFT[tdce_chan_est(1)] | TDCE Estimate |
| 2 | fd_chan_est(2) = FFT[tdce_chan_est(1)]*6/7 + FFT[tdce_chan_est(8)]*1/7 | interpolation |
| 3 | fd_chan_est(3) = FFT[tdce_chan_est(1)]*5/7 + FFT[tdce_chan_est(8)]*2/7 | interpolation |
| 4 | fd_chan_est(4) = FFT[tdce_chan_est(1)]*2/7 + FFT[tdce_chan_est(8)]*3/7 | interpolation |
| 5 | fd_chan_est(5) = FFT[tdce_chan_est(1)]*3/7 + FFT[tdce_chan_est(8)]*4/7 | interpolation |
| 6 | fd_chan_est(6) = FFT[tdce_chan_est(1)]*2/7 + FFT[tdce_chan_est(8)]*5/7 | interpolation |
| 7 | fd_chan_est(7) = FFT[tdce_chan_est(1)]*1/7 + FFT[tdce_chan_est(8)]*6/7 | interpolation |
| 8 | fd_chan_est(8) = FFT[tdce_chan_est(8)] | TDCE Estimate |

2. if the next subframe is present then:

| symb_idx | channel_estimate | calc_type |
|---|---|---|
| 9 | fd_chan_est(9) = FFT[tdce_chan_est(8)]*6/7 + FFT[next_tdce_chan_est(1)]*1/7 | interpolation |
| 10 | fd_chan_est(10) = FFT[tdce_chan_est(8)]*5/7 + FFT[next_tdce_chan_est(1)]*2/7 | interpolation |
| 11 | fd_chan_est(11) = FFT[tdce_chan_est(8)]*4/7 + FFT[next_tdce_chan_est(1)]*3/7 | interpolation |
| 12 | fd_chan_est(12) = FFT[tdce_chan_est(8)]*3/7 + FFT[next_tdce_chan_est(1)]*4/7 | interpolation |
| 13 | fd_chan_est(13) = FFT[tdce_chan_est(8)]*2/7 + FFT[next_tdce_chan_est(1)]*5/7 | interpolation |

3. else if the next subframe is not present then:
rise_chan_est=FFT[tdce_chan_est(8)]−FFT[tdce_chan_chan_est(1)];
run=15−8=7
extrapolation_adjustment=rise_chan_est/run;

| symb_idx | channel_estimate | calc_type |
|---|---|---|
| 9 | fd_chan_est(9) = FFT[tdce_chan_est(8)] + 1*extrapolation_adjustment | extrapolation |
| 10 | fd_chan_est(10) = FFT[tdce_chan_est(8)] + 2*extrapolation_adjustment | extrapolation |
| 11 | fd_chan_est(11) = FFT[tdce_chan_est(8)] + 3*extrapolation_adjustment | extrapolation |
| 12 | fd_chan_est(12) = FFT[tdce_chan_est(8)] + 4*extrapolation_adjustment | extrapolation |
| 13 | fd_chan_est(13) = FFT[tdce_chan_est(8)] + 5*extrapolation_adjustment | extrapolation |

4. if the previous subframe is present then:

| symb_idx | channel_estimate | calc_type |
|---|---|---|
| 0 | fd_chan_est(0) = FFT[tdce_chan_est(1)]*6/7 + FFT[prev_tdce_chan_est(1)]*1/7 | interpolation |

5. else if the next subframe is not present then:
rise_chan_est=FFT[tdce_chan_est(1)]−FFT[tdce_chan_est(8)];
run=15−8=7
extrapolation_adjustment=rise_chan_est/run;

| symb_idx | channel_estimate | calc_type |
|---|---|---|
| 0 | fd_chan_est(0) = FFT[tdce_chan_est(1)] − 1*extrapolation_adjustment | extrapolation |

FIG. 2 shows that the averaging strategies element 370 is responsive to the iteration controller 350 and specifically to measures or metrics output from the iteration controller 350. The averaging strategies element 370 may advantageously use measures the iteration controller 350 determines from the time domain CIR or from the channel estimation element 340. Preferably the averaging strategies element 370 uses the measures to improve the interpolation of channel estimates for data-only symbols. In particular, this information preferably includes determinations of the input symbol's signal-to-noise ratio (SNR) and doppler, preferably derived from the time domain channel impulse response output by estimation element 340. The averaging strategies element 370 may, for example, use metrics measured in the time domain for improved data-symbol channel interpolation. Metrics derived from the CIR offer increased accuracy over well-known computations in the frequency domain computed from an OFDM symbol.

Another preferred embodiment of the averaging strategies element 370 preferably is responsive to the SNR and/or doppler measurements, preferably as derived by the iteration controller 350 from the time domain CIR determined by estimator 340. The SNR and/or doppler measurements are used by the averaging strategies element 370 as an input to a look-up table of interpolating weights based on a designed granularity and expected range for SNR and/or doppler measures. One preferred way of determining the values for the interpolation weights that make up the table is to use a Wiener filter formulation as a function of SNR and doppler rate.

Figure 3:
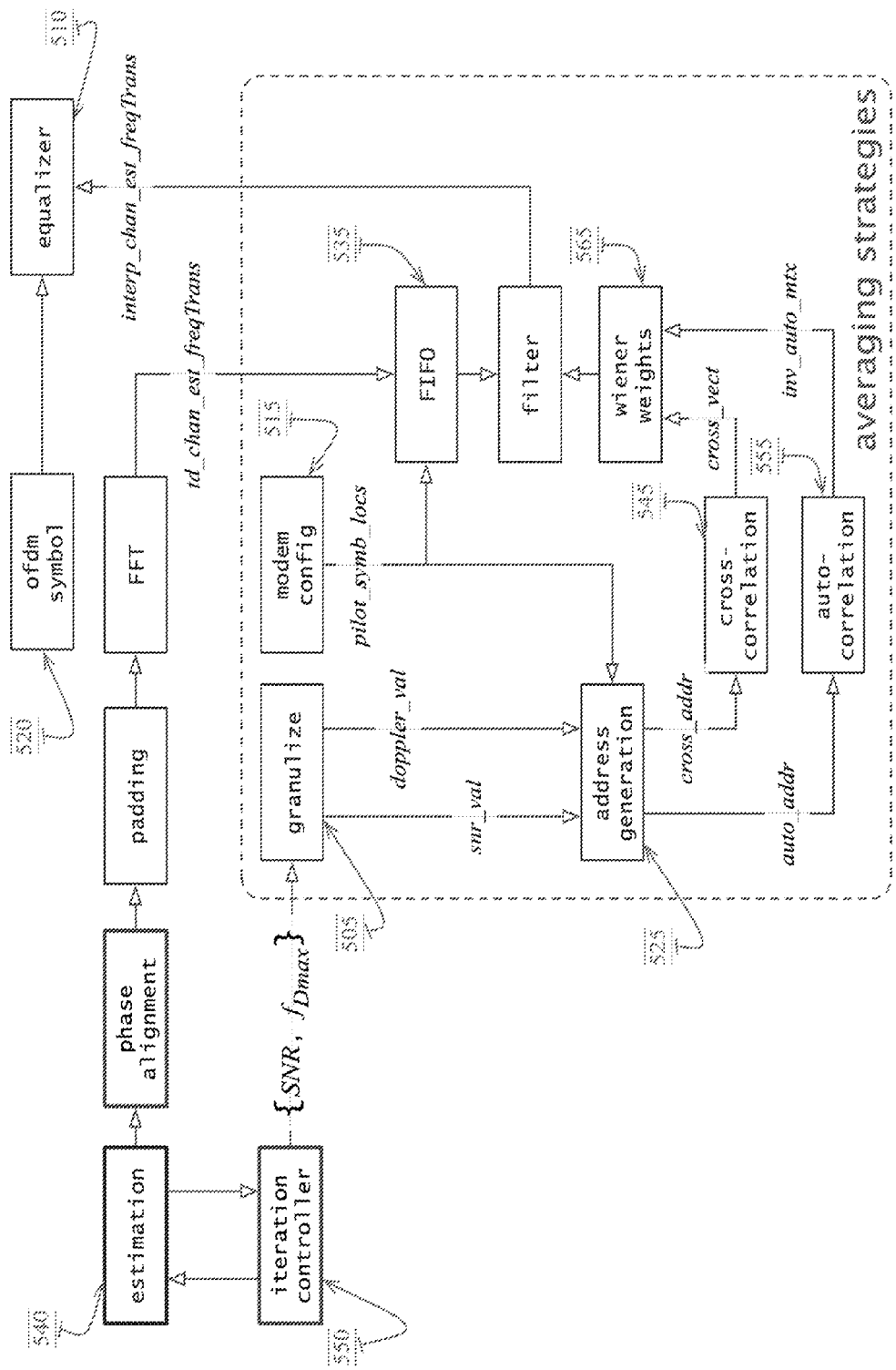
FIG. 3 schematically illustrates an implementation of an averaging strategies element implementing Wiener filtering for interpolation of channel estimates using information derived from a time domain channel estimate. The FIG. 3 averaging strategies may be used within an OFDM receiver implementing time domain channel estimation.

FIG. 3 shows aspects of another embodiment of a time domain channel estimation OFDM receiver. Aspects of the FIG. 3 receiver derive inputs or use functionality like those shown in the FIG. 2 receiver. For example, the OFDM symbol 520 may be output by the FFT 108, the equalizer 510 may include the functionality of the equalizer 110 further including the functionality described below, and the channel estimation element 540 and the iteration controller 550 may include the functionality of the corresponding elements 340 and 350 shown in FIG. 2 with the additional functionality described above. The FIG. 3 phase alignment, padding and FFT elements preferably are the same as those shown in FIG. 2. Also, the post equalizer processing shown in FIG. 2 is preferably also provided in the FIG. 3 receiver. FIG. 3 shows a preferred embodiment of an averaging strategies element that incorporates Wiener filter interpolation based on CIR measurements provided by the channel estimation element 540, and transformed to the frequency domain via the preferred embodiment that preferably performs a phase alignment 360 (in FIG. 2) prior to the FFT. The averaging strategies element of FIG. 3 is an alternate to and, in some respects presently preferred implementation of, the averaging strategies element 370 shown in FIG. 2. As previously described, for example with LTE, there are 14 symbols in a sub-frame, with only a few symbols that contain pilots to enable channel estimation in either the time or frequency domain. Consequently, a TDCE receiver preferably interpolates its measured channel estimates to provide desired channel estimates for data-only symbols for a per-symbol equalization 110 (FIG. 2) or 510 (FIG. 3).

The Wiener filter provides a particularly preferred interpolation strategy for generating channel estimates for data-only symbols from pilot symbol derived channel estimates, especially when required for the most information throughput conditions. The Wiener-Hopf equation can determine a best unbiased estimation of an unknown parameter based on second order statistics from cross-correlation and auto-correlation statistical measures.

The Wiener-Hopf equation is of the form, $$w = R^{-1} p \quad (1)$$

where R is the auto-covariance matrix, and p is the cross-correlation vector. The weights in vector w are used to filter, or in this case, interpolate the measured channel estimates to generate the desired data-symbol channel estimates. The values of R and p for such an interpolation can be estimated solely based on three parameters. Two of these three parameters, SNR and maximum doppler frequency ($f_{Dmax}$), can be measured from the CIR estimate that is the output by the channel estimation element 540. Preferably, the iteration controller 550 is responsive to the channel estimation element 540 to generate the desired SNR and maximum doppler frequency ($f_{Dmax}$) output. The third parameter is determined by the location of the pilot-bearing symbols within the sub-frame, consisting of 14 symbols in this LTE example. This third parameter is referred to as Δt in the literature. This parameter is not a calculated variable, but one of many values that are part of the receiver configuration based on the current reception settings in accordance to operation at any given moment in a wireless network. That is, Δt is a static value for any given network-imposed configuration of the receiver.

The FIG. 3 averaging strategies element preferably reduces complexity by storing values for R and p in corresponding memory, for example within a look up table. The reduced complexity comes from avoiding determining R and p "on the fly" for each symbol and subcarrier, and instead limiting the values of SNR and $f_{Dmax}$ the averaging strategies element uses. Thus the first step in the preferred embodiment is to granulize these two measured values R and p from the iteration controller 550. For example, through simulations, it can be ascertained that for variations in SNR of 11 dB SNR≤17 dB, the weights w do not vary in any significant way to affect performance within a certain tolerance. Likewise, variations in doppler from 93 Hz≤$f_{Dmax}$<137 Hz results in no significant impact to the receiver's performance. Selecting and assigning single SNR and $f_{Dmax}$ values to these ranges allows for simplification of interpolation based on the SNR and $f_{Dmax}$ values. Then, for these established granulations, the granulize element 505 preferably outputs a mean value for each value of SNR and $f_{Dmax}$ as snr_val and doppler_val. Address generation element 525 converts these snr_val and doppler_val values to addresses that identify locations within tables in respective memories that store the values for R in the auto-correlation element 555 and p in the cross-correlation element 545 that are used in Wiener filter interpolation. In particular, the values stored in autocorrelation element 555 avoid real time autocorrelation determinations by storing the $R^{-1}$ values that will multiply p in equation (1). Similarly, cross-correlation element 545 stores values and avoids real time cross-correlation determinations. Element 565 performs the Wiener filter weight multiplication, as noted in equation (1).

As noted previously, the network configuration for the receiver determines the values of Δt that are relevant to the calculation of Wiener weights stored in element 565. This globally-set variable may be copied locally, for example in element 515, to provide the pilot symbol location value as the set of indexes in pilot_symb_locs signal that is an input to the address generation element 525. That is, pilot_symb_locs is a variable that provides the indices that denote the pilot-bearing symbols. In the case of LTE, these may be pilot_symb_locs={0, 4, 7, 11}. Preferably, then, the address generation element 525 uses this information to determine the memory addresses for cross-correlation element 545 and autocorrelation element 555.

In some configurations of LTE, each symbol may have 600 active subcarriers. First-in/first-out (FIFO) element 535 preferably stores the channel estimates, represented in the frequency domain, for symbols with 600 subcarriers per symbol. The number of pilot-bearing symbols in the FIFO is determined on the basis of performance, and may span more than one sub-frame. Furthermore, the FIFO 535 preferably provides a particular delay to allow proper adjustments in the receiver preferably including through insertion of additional delays in the affected signal paths.

The OFDM symbol 520 may be a pilot-bearing symbol or just a data-only symbol. In either case, the interp_chan_est_freqTrans variables provide channel estimates for the symbol to facilitate proper equalization in equalizer 510. Indeed, the averaging strategies element (370 in FIG. 2 or as shown in FIG. 3) preferably repeats the calculations described above for each input symbol, while the FIFO 535 is only updated when a new time-domain channel estimate has been determined according to the receiver configuration by the wireless network. That is, the channel estimation element 540 and iteration controller 550 provide an input to the averaging strategies element when there is a pilot-bearing symbol. Therefore the averaging strategies element preferably outputs an interpolated channel estimate for every received symbol, while reacting to SNR, $f_{Dmax}$, and td_chan_est_freqTrans when a pilot-bearing symbol is received. The changes to pilot_symb_locs occur at times preferably determined as proper by the network configuration communications which are external to any receiver.

Figure 4:
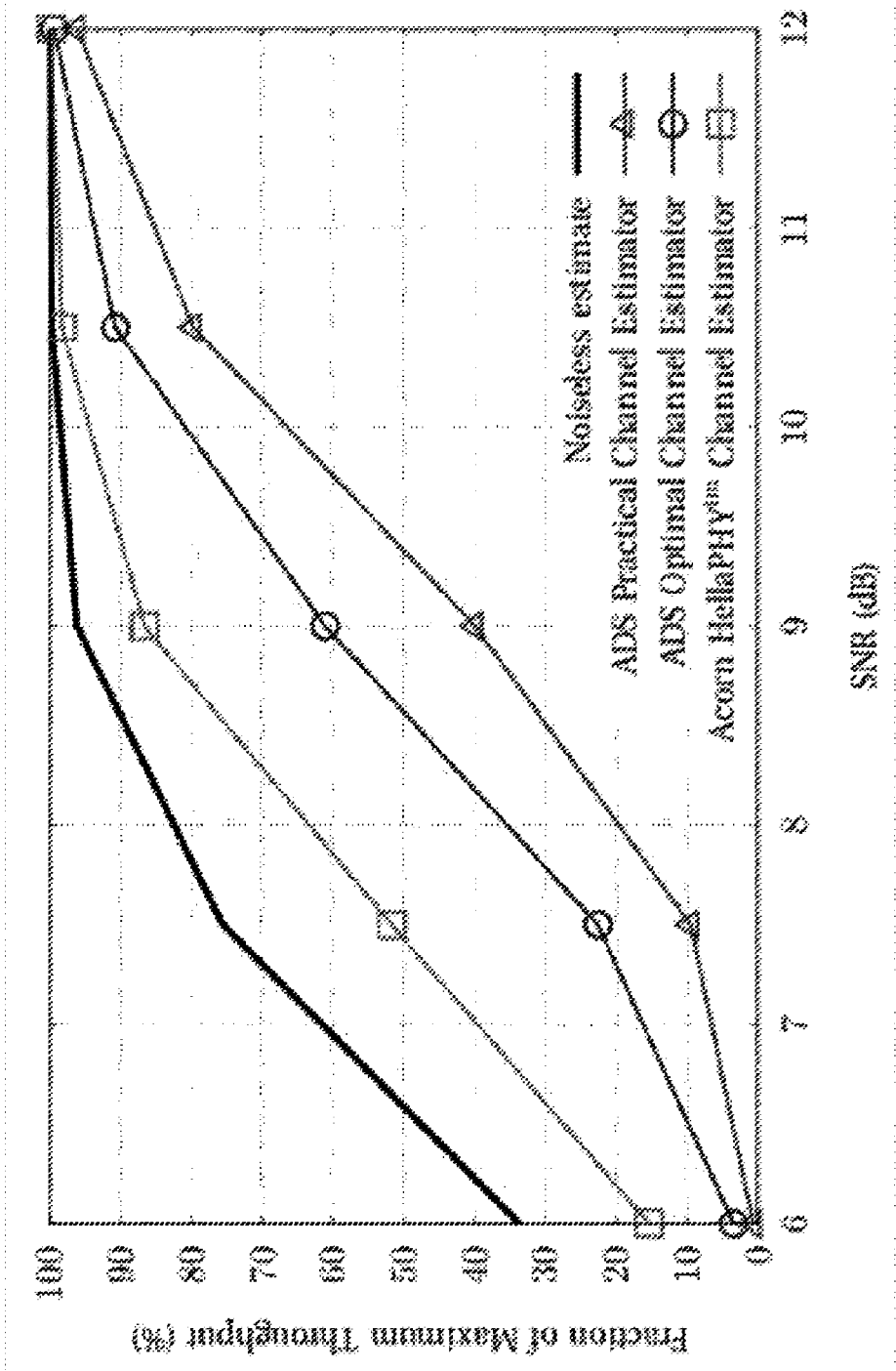
FIG. 4 shows simulation results for OFDM receivers with different channel estimation implementations.

FIG. 4 provides a number of simulations that illustrate the gains through TDCE, when compared to FDCE, for an OFDM communication link from a base station to a stationary LTE receiver. The design constraints are those of a typical mobile phone, in terms of complexity and power consumption. Four performance curves show the achievable throughput as a function of signal to noise ratio (SNR). Each OFDM subcarrier is modulated to send a given number of bits. Reception of all bits without error signifies 100% throughput.

The solid line shows what a perfect channel estimator would achieve. That is, the simulation of this equalizer uses the actual channel—this is termed "perfect knowledge"—and serves as a measure of the best performance possible. Typical OFDM receivers estimate the channel as an interpolation of the pilots in the frequency domain, which is usually termed frequency domain channel estimation (FDCE). FIG. 4 shows two well-known variations on this kind of estimation. The simpler variation interpolates without any knowledge of the key channel metrics—most notably the doppler rate of change due to receiver motion. This performance is noted in FIG. 4 as the line with the triangles at the simulated performance points. A second variation provides an upper bound on what a simulated FDCE can achieve when the FDCE is provided perfect knowledge of key channel metrics, like the actual (perfect) doppler rate of motion. The performance of this performance is shown with the circles noting the simulated measurement positions. Practical FDCE-based receivers will have some loss from this curve and will not achieve the ideal solid line based on perfect knowledge of all channel parameters.

Although the design of an OFDM symbol, and its concatenation into a frame, generally does not ensure a TDCE to have numerical stability, aspects of what is described here can be implemented to provide the support needed to achieve a practical TDCE implementation with associated performance advantages. This is shown in the FIG. 4 curve with the simulation values indicated with squares. Typically, 90% throughput is noted as a good operating point for a receiver. In this case, the ideal receiver would achieve such 90% throughput performance around 8.5 dB SNR, while for an illustrative receiver implementing a TDCE as described above that 90% throughput is observed at a 1 dB loss—requiring the signal to have a 9.5 dB SNR. In comparison, a receiver implementing a practical FDCE has a 3 dB loss from ideal, while this gap can be, at best, lessened by 1 dB if the channel metrics can be accurately measured to assist in the pilot interpolation calculations.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims.

What is claimed is:

1. A method for processing OFDM signals, comprising:
   determining a reference signal based on standard-dictated pilot locations and virtual pilot locations, the virtual pilot locations in addition to and responsive to the standard-dictated pilot locations;
   performing time domain channel estimation responsive to the reference signal, wherein the time domain channel estimation includes determining an initial channel impulse response; and
   equalizing a received symbol responsive to the time domain channel estimation, further comprising determining a training symbol facsimile responsive to a received mixed symbol of pilot and data information and correlating the reference signal with the training symbol facsimile.

2. The method of claim 1, wherein the determining a training symbol facsimile includes reducing amplitudes of data information relative to amplitudes of pilot information.

3. The method of claim 1, further comprising providing a set of virtual pilot locations interspersed with a set of standard-dictated pilot locations.

4. The method of claim 3, further comprising providing a set of virtual pilot information by interpolation based on standard-dictated pilot information.

5. A method for processing OFDM signals, comprising:
   determining a reference signal based on standard-dictated pilot locations and virtual pilot locations, the virtual pilot locations in addition to and responsive to the standard-dictated pilot locations;
   performing time domain channel estimation responsive to the reference signal; and
   equalizing a received symbol responsive to the time domain channel estimation, further comprising transforming a plurality of time domain channel estimates to frequency domain channel estimates and determining a data-only-symbol channel estimate from the frequency domain channel estimates.

6. The method of claim 5, wherein the determining a data-only-symbol channel estimate comprises interpolation between two frequency domain channel estimates.

7. The method of claim 5, wherein the determining a data-only-symbol channel estimate comprises interpolation and extrapolation based on a plurality of frequency domain channel estimates.

8. The method of claim 5, wherein the determining a data-only-symbol channel estimate comprises interpolation responsive to a signal to noise value determined from a time domain channel impulse response.

9. The method of claim 5, wherein the determining a data-only-symbol channel estimate comprises interpolation responsive to a measurement of doppler from a time domain channel impulse response.

10. The method of claim 5, wherein the determining a data-only-symbol channel estimate comprises interpolation responsive to a signal to noise value and a measurement of doppler determined from a time domain channel impulse response.

11. The method of claim 5, wherein the determining a data-only-symbol channel estimate comprises Wiener filter interpolation responsive to a signal to noise value determined from a time domain channel impulse response.

12. The method of claim 5, wherein the determining a data-only-symbol channel estimate comprises Wiener filter interpolation responsive to a measurement of doppler from a time domain channel impulse response.

13. The method of claim 5, wherein the determining a data-only-symbol channel estimate comprises Wiener filter interpolation responsive to a signal to noise value and a measurement of doppler determined from a time domain channel impulse response.

14. A method for processing OFDM signals, comprising:
  determining a reference signal based on standard-dictated pilot locations and virtual pilot locations, the virtual pilot locations in addition to and responsive to the standard-dictated pilot locations;
  performing time domain channel estimation responsive to the reference signal; and
  equalizing a received symbol responsive to the time domain channel estimation, wherein the performing time domain channel estimation comprises:
  determining an initial time domain channel impulse response comprising a number of samples;
  evaluating the initial time domain channel impulse response to identify a subset of the number of samples based on a norm of values of samples within the subset; and
  selecting samples from the subset to define a truncated time domain channel impulse response.

15. The method of claim 14, wherein the selecting samples from the subset comprises identifying a sample having peak power and identifying the truncated time domain channel impulse response as a number of samples having positions before the sample having peak power, the sample having peak power, and a second number of samples having positions after the sample having peak power.

16. The method of claim 14, wherein the norm is determined as a sum of squares of sample values within each subset within the first set of samples.

17. A method for processing OFDM signals, comprising:
  receiving a mixed symbol of pilot and data information;
  providing a set of virtual pilot information responsive to actual pilot information;
  determining a reference signal based on at least virtual pilot locations, the virtual pilot locations in addition to and responsive to actual pilot locations;
  performing time domain channel estimation responsive to the reference signal;
  equalizing a received symbol responsive to the time domain channel estimation;
  and
  determining a training symbol facsimile responsive to the received mixed symbol of pilot and data information and correlating the reference signal with the training symbol facsimile.

18. The method of claim 17, wherein time domain channel estimation includes determining an initial channel impulse response using a set of pilots defined in a frequency domain and frequency domain information responsive to a received OFDM symbol.

19. The method of claim 17, wherein time domain channel estimation comprises iteratively improving an initial channel estimate based on channel statistics.

20. The method of claim 17, wherein the training symbol facsimile is generated by reducing amplitudes of data information relative to amplitudes of pilot information.

21. A method for processing OFDM signals, comprising:
  receiving a mixed symbol of pilot and data information;
  providing a set of virtual pilot information responsive to actual pilot information;
  determining a reference signal based on at least virtual pilot locations, the virtual pilot locations in addition to and responsive to actual pilot locations;
  performing time domain channel estimation responsive to the reference signal;
  equalizing a received symbol responsive to the time domain channel estimation;
  and
  transforming a plurality of time domain channel estimates to frequency domain channel estimates and determining a data-only-symbol channel estimate from the frequency domain channel estimates.

22. A method for processing OFDM signals, comprising:
  receiving a mixed symbol of pilot and data information;
  providing a set of virtual pilot information responsive to actual pilot information;
  determining a reference signal based on at least virtual pilot locations, the virtual pilot locations in addition to and responsive to actual pilot locations;
  performing time domain channel estimation responsive to the reference signal;
  equalizing a received symbol responsive to the time domain channel estimation;
  and
  determining a data-only-symbol channel estimate responsive to two or more channel estimates based on pilot information.

23. The method of claim 22, wherein the determining a data-only-symbol channel estimate comprises interpolation between two frequency domain channel estimates.

24. The method of claim 22, wherein the determining a data-only-symbol channel estimate comprises interpolation and extrapolation based on a plurality of frequency domain channel estimates.

25. The method of claim 22, wherein the determining a data-only-symbol channel estimate comprises interpolation responsive to a signal to noise value determined from a time domain channel impulse response.

26. The method of claim 22, wherein the determining a data-only-symbol channel estimate comprises interpolation responsive to a measurement of doppler from a time domain channel impulse response.

27. The method of claim 22, wherein the determining a data-only-symbol channel estimate comprises interpolation responsive to a signal to noise value and a measurement of doppler determined from a time domain channel impulse response.

28. The method of claim 22, wherein the determining a data-only-symbol channel estimate comprises Wiener filter interpolation responsive to a signal to noise value determined from a time domain channel impulse response.

29. The method of claim 22, wherein the determining a data-only-symbol channel estimate comprises Wiener filter interpolation responsive to a measurement of doppler from a time domain channel impulse response.

30. The method of claim 22, wherein the determining a data-only-symbol channel estimate comprises Wiener filter interpolation responsive to a signal to noise value and a measurement of doppler determined from a time domain channel impulse response.

31. A method for processing OFDM signals, comprising:
  receiving a mixed symbol of pilot and data information;
  providing a set of virtual pilot information responsive to actual pilot information;
  determining a reference signal based on at least virtual pilot locations, the virtual pilot locations in addition to and responsive to actual pilot locations;
  performing time domain channel estimation responsive to the reference signal; and
  equalizing a received symbol responsive to the time domain channel estimation, wherein the performing time domain channel estimation comprises:
  determining an initial time domain channel impulse response comprising a number of samples;

evaluating the initial time domain channel impulse response to identify a subset of the number of samples based on a norm of values of samples within the subset; and selecting samples from the subset to define a truncated time domain channel impulse response.

32. The method of claim 31, wherein the selecting samples from the subset comprises identifying a sample having peak power and identifying the truncated time domain channel impulse response as a number of samples having positions before the sample having peak power, the sample having peak power, and a second number of samples having positions after the sample having peak power.

33. The method of claim 32, wherein the norm is determined as a sum of squares of sample values within each subset within the first set of samples.

34. A method for processing OFDM signals, comprising:
generating a time domain channel impulse response responsive to one or more received OFDM symbols, the time domain channel impulse response comprising a first set of samples;

evaluating the first set of samples to identify a second set of samples comprising an estimated time domain channel impulse response;

improving on the estimated time domain channel impulse response to generate an improved time domain channel estimate; and equalizing a received symbol responsive to the improved time domain channel estimate, wherein the evaluating the first set of samples comprises identifying a subset of the first set of samples comprising a truncated time domain channel impulse response, the truncated time domain channel impulse response identified based on a norm of values of samples within the subset.

35. The method of claim 34, further comprising aligning the improved time domain channel estimate with an alignment of a received symbol.

36. The method of claim 34, wherein the evaluating the first set of samples further comprises identifying a sample having peak power and identifying the second set of samples as a number of samples having positions before the sample having peak power, the sample having peak power, and a second number of samples having positions after the sample having peak power.

37. The method of claim 36, wherein the norm is determined as a sum of squares of sample values within each subset within the first set of samples.

38. The method of claim 36, further comprising aligning the improved time domain channel estimate with an alignment of a received symbol.

39. The method of claim 34, wherein the improving on the estimated time domain impulse response is an iterative process using second order statistics.

40. The method of claim 39, further comprising aligning the improved time domain channel estimate with an alignment of a received symbol.

41. A method for processing OFDM signals, comprising:
generating a time domain channel impulse response responsive to one or more received OFDM symbols, the time domain channel impulse response comprising a first set of samples;

evaluating the first set of samples and identifying a first sample position based on amplitudes of the first set of samples and, responsive to identifying the first sample position, selecting a second set of samples to be a truncated time domain channel impulse response;

improving on the truncated time domain channel impulse response to generate an improved time domain channel estimate; and equalizing a received symbol responsive to the improved time domain channel estimate.

42. The method of claim 41, further comprising determining an offset to the first sample position and aligning the improved time domain channel estimate with an alignment of a received symbol responsive to the offset.

43. The method of claim 41, wherein the evaluating comprises determining a norm of values of samples within successive subsets of the first set of samples.

44. The method of claim 43, wherein the norm is determined as a sum of squares of sample values within each successive subset within the first set of samples.

45. The method of claim 41, wherein the first sample position corresponds to a sample having peak power and identifying the second set of samples as a number of samples having positions before the first sample position, the sample at the first sample position, and a second number of samples having positions after the first sample position.

46. The method of claim 45, further comprising determining an offset to the first sample position and aligning the improved time domain channel estimate with an alignment of a received symbol responsive to the offset.

47. The method of claim 46, wherein the improving on the truncated time domain impulse response is an iterative process using second order statistics.

* * * * *